US008081603B2

(12) United States Patent
Kapoor et al.

(10) Patent No.: US 8,081,603 B2
(45) Date of Patent: Dec. 20, 2011

(54) COMPRESSION STATIC AND SEMI-STATIC CONTEXT TRANSFER

(75) Inventors: Rohit Kapoor, San Diego, CA (US);
Haipeng Jin, San Diego, CA (US);
Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 12/167,732

(22) Filed: Jul. 3, 2008

(65) Prior Publication Data

US 2009/0022107 A1      Jan. 22, 2009

Related U.S. Application Data

(60) Provisional application No. 60/950,581, filed on Jul. 18, 2007.

(51) Int. Cl.
*H04W 4/00* (2009.01)
(52) U.S. Cl. ..................... 370/331
(58) Field of Classification Search .......... 370/331; 455/403, 422.1, 436, 442
See application file for complete search history.

(56) References Cited

U.S. PATENT DOCUMENTS

| 7,233,583 | B2 | 6/2007 | Asthana et al. | |
|---|---|---|---|---|
| 7,376,424 | B2 * | 5/2008 | Kim et al. | 455/436 |
| 7,450,547 | B2 * | 11/2008 | Kim et al. | 370/331 |
| 7,899,025 | B2 * | 3/2011 | Bi et al. | 370/349 |
| 2005/0090273 | A1 * | 4/2005 | Jin et al. | 455/502 |
| 2005/0180383 | A1 * | 8/2005 | Kim et al. | 370/349 |
| 2005/0286469 | A1 * | 12/2005 | Yang et al. | 370/331 |
| 2007/0058679 | A1 * | 3/2007 | Pelletier et al. | 370/477 |
| 2007/0129075 | A1 * | 6/2007 | Kim et al. | 455/436 |
| 2007/0242683 | A1 * | 10/2007 | Pelletier et al. | 370/401 |
| 2007/0242703 | A1 * | 10/2007 | Pelletier et al. | 370/521 |

FOREIGN PATENT DOCUMENTS

| EP | 1056259 A1 | 11/2000 |
|---|---|---|
| WO | WO0211397 A1 | 2/2002 |

OTHER PUBLICATIONS

Bormann et al. "RObust header Compression (ROHC): framework and four profiles: RTP, UDP, BSP and uncompressed", Network working group, the internet society, Jul. 2001.*

(Continued)

*Primary Examiner* — Chi Pham
*Assistant Examiner* — Fan Ng
(74) *Attorney, Agent, or Firm* — Milan Patel; Kam T. Tam

(57) ABSTRACT

Systems, methodologies, and devices are described that facilitate transferring a subset of compression context from a source base station to a target base station during an inter-base station handover of a mobile device to facilitate establishment of compression context between the mobile device and target base station. The source base station can transfer a subset of compression context comprising static and semi-static context to the target base station during inter-base station handover to at least partially establish compression context between the mobile device and target base station prior to or during handover. The source base station can transmit, to the mobile device, indicator information related to compression context transferred. The target base station can at least partially establish compression context based on received subset of compression context to facilitate efficient communication with the mobile device and can establish any remaining portion of compression context with the mobile device after handover.

55 Claims, 20 Drawing Sheets

OTHER PUBLICATIONS

International Search Report and the Written Opinion—PCT/US2008/070379, International Search Authority—European Patent Office—Jun. 30, 2009.

Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph—p. 3, left-hand column, paragraph 3 p. 5, right-hand column, last paragraph—p. 7, right-hand column, last paragraph.

* cited by examiner

COMPRESSION STATIC AND SEMI-STATIC CONTEXT TRANSFER

CROSS-REFERENCE TO RELATED APPLICATIONS

This application claims the benefit of U.S. Provisional Patent application Ser. No. 60/950,581 entitled "A METHOD AND APPARATUS FOR ROHC STATIC AND SEMI-STATIC CONTEXT TRANSFER" which was filed Jul. 18, 2007, the entirety of the aforementioned application is herein incorporated by reference.

BACKGROUND

I. Field

The following description relates generally to wireless communications, and more particularly to transmission of static context and semi-static context during handover of mobile device to another cell.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, information (e.g., data, header information, etc.) associated with a mobile device can be compressed before being transmitted to facilitate efficient communication in a wireless communication environment. For instance, a Robust Header Compression (RoHC) engine can be employed to compress information, such as headers (e.g., Internet Protocol (IP) header, Uniform Datagram Protocol (UDP) header, Real-Time Transfer Protocol (RTP) header, communicated between a base station and a mobile device. Conventionally, in certain communication systems (e.g., 1x, Data Optimizer (DO), (HSPA)), the RoHC function resides in the Base Station Controller (BSC) or Radio Network Controller (RNC), and RoHC context re-establishment is required only for inter-BSC handovers or inter-RNC handovers, which typically occur far less frequently than intra-BSC handovers or intra-RNC handovers.

However, in communication systems, such as Long Term Evolution (LTE) communication systems, the Packet Data Convergence Protocol (PDCP) function typically resides in the base station (e.g., eNode B) and not in an access gateway. As a result, the RoHC context has to be re-established at each inter-base station handover of the mobile device from one base station to another base station. This can result in larger packets of data, such as IP header, RTP header, and UDP header, being transmitted in an uncompressed form to the mobile device until RoHC context is re-established, where after the RoHC context is re-established data can be transmitted between the mobile device and base station in a more desirable compressed form. Re-establishing RoHC context at each handover can result in a significant capacity loss and/or latency increase for some applications, such as voice over IP (VoIP) and mobile network gaming, which can result in a quality or user-experience degradation at handover events.

Certain information, such as the portions of the IP header (e.g., version, flow label next header, source address, destination address, etc.), RTP header (e.g., version extension, synchronization source (SSRC), etc.), and UDP header (e.g., source port, destination port), is static context or semi-static context that can be the same or virtually the same, or changed relatively infrequently, for a flow. When a handover of a mobile device from one base station to a disparate base station occurs, there is typically a short period of time between the time that the message to the mobile device directing the handover is sent to the mobile device and the time when the handover occurs. As it is desirable to establish RoHC context to facilitate compressing data for transmission, it is desirable to be able to at least partially or fully re-establish RoHC context during a handover in an efficient manner.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient connection and communication associated with a communication device (e.g., mobile device) within a network by facilitating efficient transfer of a subset of compression context from a source base station to a target base station during an inter-base station handover of a mobile device to facilitate efficient establishment of compression context between the mobile device and target base station. In one aspect, the source base station can transfer a subset of compression context (e.g., compression static and semi-static context) to the target base station during inter-base station handover of the mobile device from the source base station to the target base station to at least partially establish compression context between the mobile device and target base station prior to or during handover. The source base station can transmit, to the mobile device, indicator information related to the subset of compression context transferred from the source base station to the target base station. The target base station can at least partially establish compression context based at least in part on the received subset of compression context to facilitate efficient communication with the mobile device and can establish any remaining portion of compression context (e.g., compression dynamic context) with the mobile device after handover.

According to related aspects, a method that facilitates communication associated with a mobile device is described herein. The method can include receiving at least one indicator that indicates what portion of compression context is transferred from a source base station to a target base station to facilitate establishing full compression context between the mobile device and the target base station during a handover of the mobile device from the source base station to the target base station. Further, the method can comprise communicating with the target base station to establish any remaining portion of compression context that remains to be established after handover of the mobile device to the target base station, the remaining portion of compression context to be established is determined based at least in part on the at least one indicator.

Another aspect relates to a wireless communications apparatus. The wireless communications apparatus can include a memory that retains instructions related to reception of at least one indicator that indicates what subset of compression context is transferred from a source base station to a target base station during handover of a mobile device from the source base station to the target base station, the mobile device facilitates establishing a remaining subset of compression context to be established between the mobile device and the target base station based at least in part on the indicator. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for receiving at least one indicator that specifies what portion of compression context is transferred from a source base station to a target base station to facilitate establishing full compression context between the mobile device and the target base station during a handover of the mobile device from the source base station to the target base station. Further, the wireless communications apparatus can comprise means for communicating with the target base station to establish any remaining portion of compression context that remains to be established after handover of the mobile device to the target base station, the remaining portion of compression context to be established is determined based at least in part on the at least one indicator.

Still another aspect relates to a computer program product, comprising: a computer-readable medium comprising code for: receiving at least one indicator that indicates what portion of compression context is transferred from a source base station to a target base station to facilitate establishing full compression context between the mobile device and the target base station during a handover of the mobile device from the source base station to the target base station; and communicating with the target base station to establish any remaining portion of compression context that remains to be established after handover of the mobile device to the target base station, the remaining portion of compression context to be established is determined based at least in part on the at least one indicator.

In accordance with another aspect, an apparatus in a wireless communication system can include a processor, wherein the processor can be configured to receive at least one indicator that specifies what portion of compression context is transferred from a source base station to a target base station to facilitate establishing full compression context between the mobile device and the target base station during a handover of the mobile device from the source base station to the target base station. Moreover, the processor can be configured to communicate with the target base station to establish any remaining portion of compression context that remains to be established after handover of the mobile device to the target base station, the remaining portion of compression context to be established is determined based at least in part on the at least one indicator.

According to other aspects, a method that facilitates communication associated with a mobile device is described herein. The method can include transmitting a subset of compression context from a source base station to a target base station to facilitate establishing at least the subset of compression context prior to or during handover of the mobile device from the source base station to the target base station. Further, the method can comprise transmitting at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

Yet another aspect relates to a wireless communications apparatus that can include a memory that retains instructions related to transmission of a subset of compression context from a source base station to a target base station to facilitate establishing at least the subset of compression context prior to or during inter-base-station handover of the mobile device from the source base station to the target base station, and transmission of at least one message comprising at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for transmitting a subset of compression context from a source base station to a target base station to facilitate establishing at least the subset of compression context prior to or during handover of the mobile device from the source base station to the target base station. Further, the wireless communications apparatus can include means for transmitting at least one message comprising at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

Still another aspect relates to a computer program product, comprising: a computer-readable medium comprising code for: transferring a subset of compression context from a source base station to a target base station to facilitate establishing at least the subset of compression context prior to or during handover of the mobile device from the source base station to the target base station; and transmitting at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

In accordance with another aspect, an apparatus in a wireless communication system can include a processor, wherein the processor can be configured to transfer a subset of compression context from a source base station to a target base station to facilitate establishing at least the subset of compression context prior to or during handover of the mobile device from the source base station to the target base station. Further, the processor can be configured to transmit at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

According to still other aspects, a method that facilitates communication associated with a mobile device is described herein. The method can include receiving a subset of compression context from a source base station to facilitate establishing at least the subset of compression context prior to or during inter-base-station handover of the mobile device from the source base station to a target base station. Further, the method can comprise applying the subset of compression context to establish at least the subset of compression context prior to or during the inter-base-station handover.

Yet another aspect relates to a wireless communications apparatus that can include a memory that retains instructions related to reception of a subset of compression context from a source base station to facilitate establishing at least the subset of compression context prior to or during inter-base-station handover of the mobile device from the source base station to a target base station, and application of the subset of compression context to establish at least the subset of compression context prior to or during the inter-base-station handover. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for receiving a subset of compression context from a source base station to facilitate establishing at least the subset of compression context prior to or during inter-base-station handover of the mobile device from the source base station to a target base station. Further, the wireless communications apparatus can include means for applying the subset of compression context to establish at least the subset of compression context prior to or during the inter-base-station handover Still another aspect relates to a computer program product, comprising: a computer-readable medium comprising code for: receiving a subset of compression context from a source base station to facilitate establishing at least the subset of compression context prior to or during inter-base-station handover of the mobile device from the source base station to a target base station, and applying the subset of compression context to establish at least the subset of compression context prior to or during the inter-base-station handover.

In accordance with another aspect, an apparatus in a wireless communication system can include a processor, wherein the processor can be configured to receive of a subset of compression context from a source base station to facilitate establishing at least the subset of compression context prior to or during inter-base-station handover of the mobile device from the source base station to a target base station. Further, the processor can be configured to apply the subset of compression context to establish at least the subset of compression context prior to or during the inter-base-station handover.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
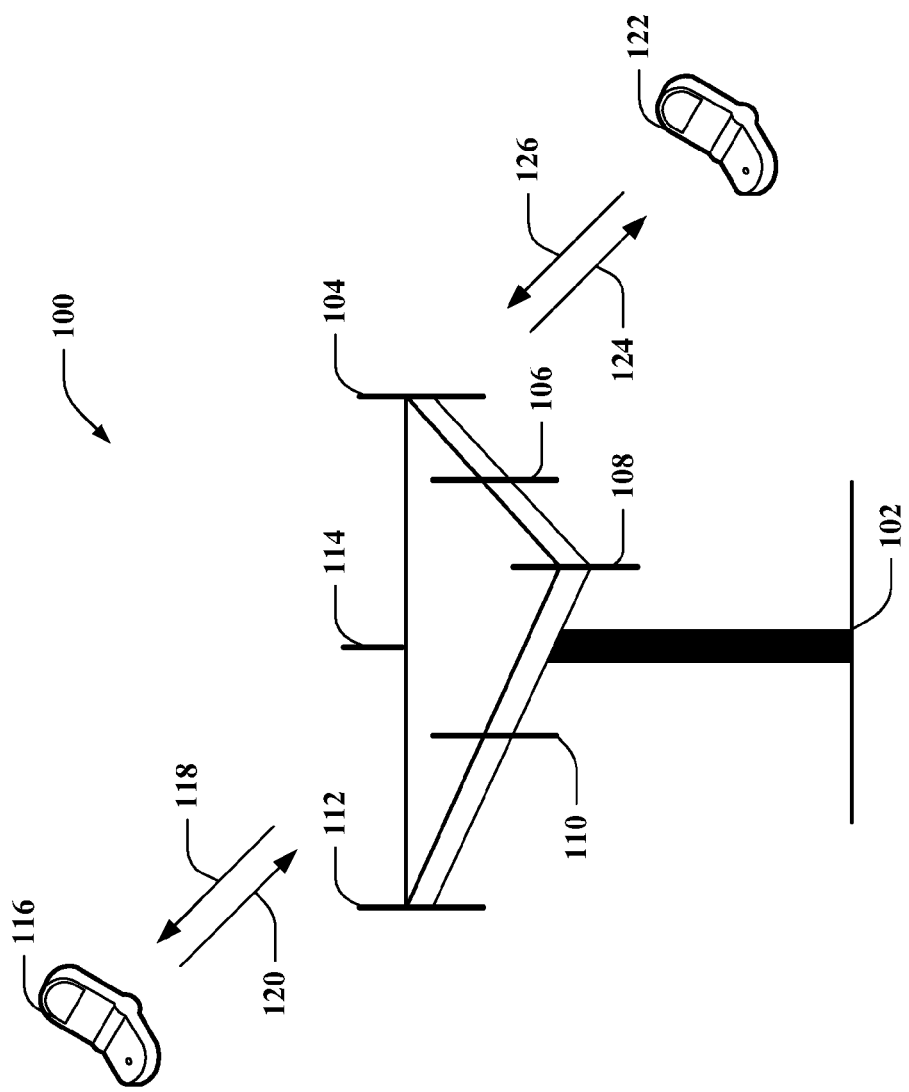
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," "communicator," "controller," "detector," "interrogator," "indicator," "selector," "compressor," "evaluator," "data store," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. It is to be appreciated that, while one base station 102 is depicted in FIG. 1, the disclosed subject matter can comprise more than one base station in the network, such as, for example, a serving base station 102 and one or more neighbor base stations 102.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Typically, certain information (e.g., data, header information) associated with a mobile device can be compressed before being transmitted to facilitate efficient communication in the wireless communication environment. For instance, a Robust Header Compression (RoHC) engine can be employed to compress information, such as, for example, headers (e.g., Internet Protocol (IP) header, Uniform Datagram Protocol (UDP) header, Real-Time Transfer Protocol (RTP) header), communicated between a base station and a mobile device. Before RoHC compression is utilized to compress the information, RoHC context has to be established between the base station and the mobile device. Conventionally, in certain communication systems (e.g., 1x, Data Optimizer (DO), (HSPA)), the RoHC function resides in the Base Station Controller (BSC) or Radio Network Controller (RNC) associated with base stations, and RoHC context re-establishment is required only for inter-BSC handovers or inter-RNC handovers, which typically occur far less frequently than intra-BSC handovers or intra-RNC handovers.

In certain other communication systems, such as LTE communication systems, the Packet Data Convergence Protocol (PDCP) function typically resides in the base station (e.g., eNode B) and not in an access gateway. As a result, a RoHC engine can reside in each base station, and the RoHC context has to be re-established at each inter-base station handover of the mobile device from one base station (e.g., source base station) to another base station (e.g., target base station). This can result in larger packets of data, such as the IP header, UDP header, and/or RTP header being transmitted in an uncompressed form between the mobile device and target base station until RoHC context is re-established. After the RoHC is re-established information can be transmitted between the mobile device and the target base station in a more desirable compressed form in accordance with the RoHC function. Having to re-establish RoHC context at each handover can result in a significant capacity loss and/or latency increase for some applications, such as voice over IP (VoIP) and mobile network gaming, which can result in a quality or user-experience degradation at handover events.

When a handover of a mobile device from one base station to a disparate base station occurs, there is typically a short period of time between the time that the message to the mobile device directing the handover is sent to the mobile device and the time when the handover occurs. As it is desirable to establish RoHC context to facilitate compressing data for transmission, it can be desirable to be able to at least partially or fully re-establish RoHC context during a handover in an efficient manner.

Information, such as compression (e.g., ROHC) context, transmitted between a mobile device (e.g., 116) and base station 102 can comprise compression static context, semi-static context, and dynamic context. Static context is information that typically does not change and/or is the same over disparate base stations. Static context can include, for example, portions of the IP header (e.g., for Internet Protocol version 6 (IPv6), version, flow label, next header, source address, destination address, etc.), UDP header (e.g., source port, destination port), and/or RTP header (e.g., version extension, synchronization source (SSRC), etc.). Semi-static context can include other portions of the IP header, UDP header, and/or RTP header, such as for example, traffic class, hop limit (e.g., with regard to IPv6), and payload type (e.g., with regard to RTP). The IP header, UDP header, and/or RTP header also can include dynamic context, such as, for example, checksum (e.g., with regard to UDP), sequence number and timestamp (e.g., with regard to RTP), and/or RTP-related information, such as TS_STRIDE (e.g., timestamp stride) and TIME_STRIDE.

In accordance with one embodiment, the subject innovation can facilitate transferring at least a portion of the compression context, such as compression static context and/or semi-static context, from a source base station 102 (e.g., cell associated with the source base station 102) to a target base station 102 (e.g., cell associated with the target base station 102) during a handover (e.g., inter-base station handover) of a mobile device (e.g., 116, 122) from the source base station 102 to the target base station 102 to facilitate efficiently establishing at least a portion of the compression context (e.g., compression static and/or semi-static context) while the mobile device is being handed over from the source base station 102 to the target base station 102.

It is to be appreciated and understood that a compression context transfer may not be necessary when an intra-base station handover occurs (e.g., handover of mobile device 116 from one cell in a serving base station 102 to another cell of the same serving base station 102). In such instance, the serving base station 102 can maintain the compression context.

In accordance with another embodiment, during a handover of a mobile device 116 from a source base station 102 to a target base station 102, the source base station 102 can transmit all compression context information (e.g., compression static, semi-static, and dynamic context), a desired portion of the compression context information (e.g., compression static and semi-static context), or no compression context information related to the mobile device 116 to the target base station 102 to facilitate establishing compression context between the target base station 102 and the mobile device 116. The source base station 102 also can transmit an indicator, such as a handover indicator, to the mobile device 116, where the handover indicator can specify whether the handover is an inter-base station handover or an intra-base station handover. The handover indicator can facilitate enabling the mobile device 116 to determine what type of handover is occurring and whether any compression context is to be re-established with a particular base station 102. In one aspect, the handover indicator can be a base station identifier, where each base station 102 can be associated with a respective base station identifier that identifies the associated base station 102.

In another aspect, an indicator(s) (e.g., handover indicator, context indicator) can respectively indicate whether there was a full compression context transfer, partial compression context transfer (e.g., compression static and semi-static context transfer), or no compression context transfer by the source base station 102 to the target base station 102 during handover of the mobile device 116 to the target base station 102. For example, the indicator(s) (e.g., indication mechanism) can be transmitted via session or connection configuration and can be updated via mechanisms to update the connection configuration, or via a handover command, as desired. The indicator related to compression context can be the same indicator (e.g., handover indicator) that indicates whether the handover is inter-base station or intra-base station or the indicator can be a different indication, such as a context indicator, that can relate information related to the compression context transfer to the target base station 102 during handover.

For example, during an inter-base station handover, a handover indicator, which can be transmitted from the source base station 102 to the mobile device 116, can specify that the handover is an inter-base station handover, which can result in compression context having to be re-established between the mobile device 116 and target base station 102, and can further indicate that a portion of compression context, comprising compression static and semi-static context, is or has been transferred from the source base station 102 to the target base station 102 prior to or during handover of the mobile device 116 to the target base station 102. As an alternative example, during an inter-base station handover, a handover indicator sent to the mobile device 116 can specify that the handover is an inter-base station handover, which can result in compression context having to be re-established between the mobile device 116 and target base station 102, and a context indicator, which can be transmitted from the source base station 102 to the mobile device 116, can indicate a portion of compression context, comprising compression static and semi-static context, is or has been transferred from the source base station 102 to the target base station 102 prior to or during handover of the mobile device 116 to the target base station 102.

Figure 2:
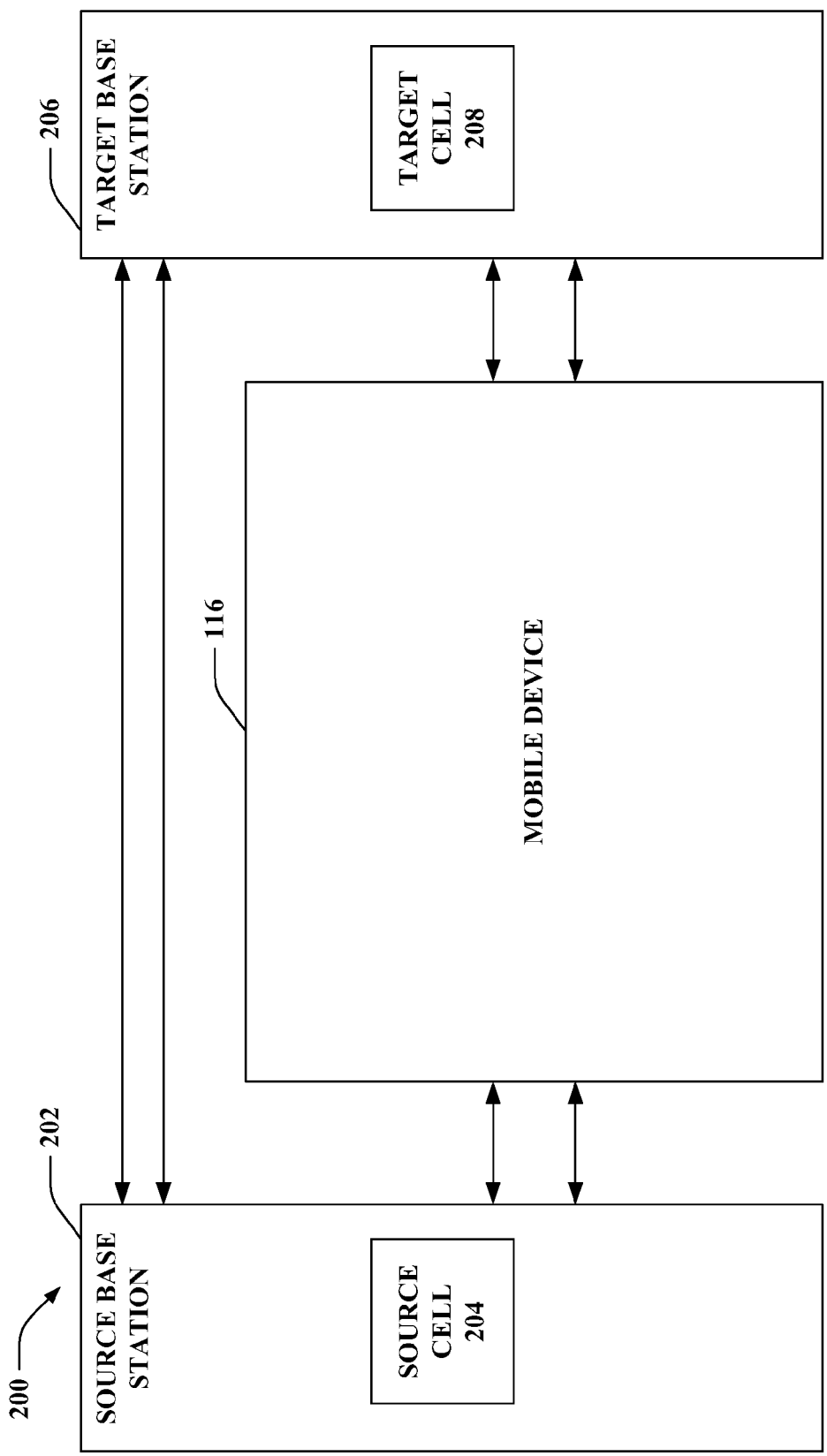
FIG. 2 is an illustration of an example wireless communication system that can facilitate efficient compression context transfer in accordance with various embodiments disclosed herein.

Referring to FIG. 2 illustrates a wireless communication system 200 that can facilitate efficient compression context (e.g., RoHC context) transfer in accordance with various embodiments presented herein. System 200 can comprise a source base station 202 that can be a base station serving and in connection with a mobile device 116 in a wireless communication environment. The source base station 202 can include a source cell 204 that can be the cell that is serving and in connection with the mobile device 116. The system 200 also can include a target base station 206 that can be a base station to which the mobile device 116 can be handed over, for instance, when a cell (e.g., target cell 208) of the target base station 206 is desired over the current serving cell (e.g., source cell 204). In such instance, the mobile device 116 can be handed over to the target cell 208 from the source cell 204. It is to be appreciated and understood that the mobile device 116, source base station 202, source cell 204, target base station 206, and target cell 208, each can be the same or similar as, and/or can comprise the same or similar functionality as, respective components, such as more fully described herein, for example, with regard to system 100.

In accordance with an embodiment, system 200 can facilitate efficient transfer of a desired portion of compression context (e.g., RoHC context) from a source base station 202 to a target base station 206 during a handover of a mobile device 116 from a source cell 204 to a target cell 208. In one aspect, the mobile device 116 can be communicatively connected (e.g., wirelessly connected) with the source cell 204 of the source base station 202. The mobile device 116 can transmit a desired number (e.g., 1, 2, 3, . . . ) of initialization and refresh (IR) packets to the source base station 202, where each IR packet can include information, such as compression static context, semi-static context, and dynamic context, to facilitate establishing the compression context with the source base station 202 to facilitate use of compression when data is transmitted between the source base station 202 and mobile device 116. Typically, more than one IR packet (e.g., 2 IR packets, 3 IR packets) is transmitted to ensure that at least one IR packet reaches a decompressor of the source base station 202. To establish a compression context, a desired number of compression RTP profile data packets (e.g., when RTP is employed with IP and UDP) and/or compression UDP profile data packets (e.g., when RTP is not employed with IP and UDP) can be transmitted, for example, from the mobile device 116 to the source base station 202, where the compression RTP profile data packets and/or compression UDP profile data packets can comprise the desired number of IR packets as well as other information (e.g., UOR2 Ext 3 information). Further, additional information, such as that contained in a Type2 Ext3 packet also can be sent, as desired. For instance, the Type2 Ext3 packet can be used, for example, to indicate changes to IP headers, such as IP header flags, RTP payload type, etc., and/or carry TS_STRIDE (e.g., the RTP timestamp difference between successive packets). The information in the compression RTP profile data packet and/or RoHC UDP profile data packet can be used by the compressor (e.g., compressor comprising a compressor and decompressor) of the source base station 202 to establish the compression context to facilitate compression/decompression of data transmitted between the source base station 202 and the mobile device 116.

The mobile device 116 can continuously monitor and measure respective signal strengths of cells (e.g., cells, such as source cell 204, of the source base station 202, cells, such as the target cell 208, of a target base station 206) and can provide the signal strength information to the source base station 202 to facilitate determining whether a handover of the mobile device 116 from one cell to another cell is to occur. When the source base station 202 determines that a handover of the mobile device 116 is to occur, the source base station 202 can transmit a message to the mobile device 116 that the mobile device 116 is to switch from the source cell 204 to another cell, where the message may indicate that the handover is to occur at a predetermined period of time (e.g., 100 milliseconds (ms)) from the time of the message.

In accordance with an aspect, if the source base station 202 determines that a handover is to occur and the handover (e.g., inter-base station handover) is from a cell (e.g., source cell 204) of the source base station 202 to a target cell 208 of a target base station 206, the source base station 202 can transmit a desired portion of compression context, such as compression static context and semi-static context (e.g., RoHC static and semi-static context), related to the mobile device 116 to the target base station 206 to facilitate establishing compression context between the target base station 206 and the mobile device 116. The target base station 206 can utilize the received compression static context and semi-static context to begin establishing the compression context between the mobile device 116 and the target base station 206 (and target cell 208) during handover of the mobile device 116 to the target base station 206.

In another aspect, the source base station 202 also can transmit an indicator(s) (e.g., handover indicator, such as a base station identifier; context indicator) to the mobile device 116 that can indicate to the mobile device 116 that whether the handover is an inter-base station handover or an intra-base station handover, and/or can specify the portion of compression context (e.g., compression static context and semi-static context), if any, that has been (or is being) sent by the source base station 202 to the target base station 206, and, when there is a compression context transfer, can indicate that the mobile device 116 does not have to establish all of the compression context (e.g., compression static context, semi-static context, and dynamic context) between the target base station 206 and mobile device 116 after handover to facilitate establishing the compression context, but instead, the mobile device 116 can facilitate establishing the portion of compression context, such as compression dynamic information, that is desired (e.g., remains to be established) in order to establish the full compression context between the target base station 206 and mobile device 116.

In an aspect, the desired indicator(s) (e.g., handover indicator, such as a base station identifier; context indicator) can be provided as part of the handover message, or can be transmitted in a disparate message that can be sent to the mobile device 116 before or after the handover message is sent to the mobile device 116. For instance, a base station identifier can be used to indicate to the mobile device 116 that the handover is to a cell (e.g., target cell 208) of a disparate base station (e.g., target base station 206). A base station identifier can be transmitted, for example, via the primary broadcast channel (primary-BCH) or via the handover command from the source base station 202 to the mobile device 116. Each cell in a particular base station can transmit the same base station identifier, which can be different from a base station identifier transmitted by cells of a disparate base station. As a result, when the mobile device 116 receives a base station identifier associated with a target base station 206 from the source base station 202, the base station identifier can indicate that an inter-base station handover is occurring, compression context is to be re-established with the target base station 206, and/or a desired portion of compression context (e.g., at least the compression static context and/or semi-static context) has been transmitted by the source base station 202 to the target base station 206, and the mobile device 116 does not have to perform a full compression context transfer with the target base station 206, but instead the mobile device 116 can facilitate establishing the remaining compression context (e.g., compression dynamic context) between the target base station 206 and mobile device 116, where the remaining compression context can be the compression context that was not sent by the source base station 202 to the target base station 202.

In accordance with another embodiment, system 200 can facilitate employing the source base station 202 to transmit a desired portion of compression context (e.g., RoHC context), which can be all compression context (e.g., compression static, semi-static, and dynamic context), a portion of compression context (e.g., compression static and semi-static context), or no compression context, to the target base station 206 during a handover of the mobile device 116 from the source base station 202 to the target base station 206 to facilitate establishing compression context between the mobile device 116 and target base station 206. In an aspect, the source base station 202 also can transmit an indicator(s) (e.g., handover indicator and/or context indicator), to the mobile device 116, that can respectively indicate whether there was a full compression context transfer, partial compression context transfer (e.g., compression static and semi-static context transfer), or no compression context transfer by the source base station 202 to the target base station 206. For example, the indicator(s) (e.g., indication mechanism) can be transmitted via session or connection configuration and can be updated via mechanisms to update the connection configuration, or via a handover command, as desired.

It is to be appreciated that signaling can become significantly more complex when attempting to send full compression context (e.g., compression static, semi-static, and dynamic context) from the source base station 202 to the target base station 206, as opposed to sending the compression static context and semi-static context from the source base station 202 to the target base station 206. For example, full context transfer can result in having to handle interoperability issues, such as, for certain dynamic fields (e.g., RTP, sequence number (SN), timestamp (TS), . . . ), values in the reference window may have to be transferred, and the size of the reference window can be different across disparate implementations; and/or generic RoHC parameters, such as Optimistic Approach (OA), k1, n1, k2, n2 may have to be transferred, and some or all of these fields can have different values across disparate implementations. As a result, the efficiency cost of full compression context transfer by the source base station to the target base station may be undesirable and/or cost prohibitive. Thus, it can be desirable to transfer the compression static context and semi-static context, but not the compression dynamic context. In such instance, the efficiency gains can be very high, while the complexity of implementing such aspect of the subject innovation can be relatively low in comparison.

The subject innovation can facilitate efficiently re-establishing compression context (e.g., RoHC context) after a mobile device is handed over from a source cell 204 of a source base station 202 to a target cell 208 of a target base station 208. For example, the compression context can be established between the mobile device 116 and target base station 206 more quickly than conventional systems or techniques for establishing compression context. As another example, there can be a reduction in capacity loss and/or latency during handover from a source cell 204 of a source base station 202 to a target cell 208 of a target base station 208, as compared to conventional systems or techniques.

Figure 3:
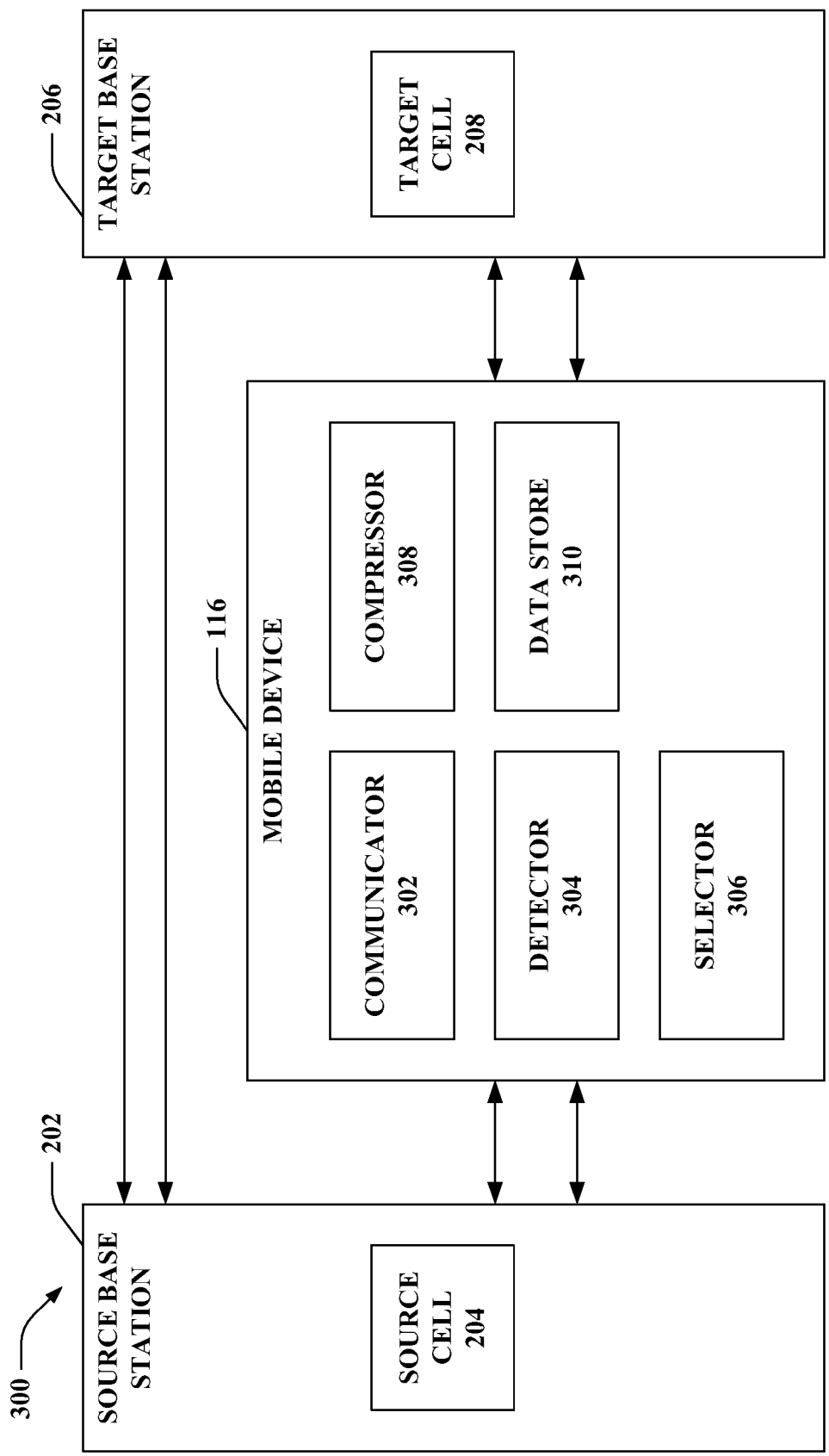
FIG. 3 is a depiction of an example system that can facilitate compression context transfer from a source base station to a target base station to facilitate communication associated with a mobile device in accordance with an aspect of the disclosed subject matter.

Referring to FIG. 3, depicted is an example system 300 that can facilitate compression context transfer from a source base station to a target base station to facilitate communication associated with a mobile device in accordance with an aspect of the disclosed subject matter. System 300 can comprise a source base station 202 that can be a base station serving and in connection with a mobile device 116 in a wireless communication environment. The source base station 202 can include a source cell 204 that can be the cell that is serving and in connection with the mobile device 116. The system 300 also can include a target base station 206 that can be a base station to which the mobile device 116 can be handed over to, for instance, when a cell (e.g., target cell 208) of the target base station 206 is desired over the current serving cell (e.g., source cell 204). In such instance, the mobile device 116 can be handed over to the target cell 208 from the source cell 204. It is to be appreciated and understood that the mobile device 116, source base station 202, source cell 204, target base station 206, and target cell 208, each can be the same or similar as, and/or can comprise the same or similar functionality as, respective components, such as more fully described herein, for example, with regard to system 100 and system 200.

In accordance with an aspect, the mobile device 116 can comprise a communicator 302 that can facilitate transmitting and/or receiving information from a base station(s) (e.g., source base station 202, target base station 206) and/or other devices associated with system 300. For instance, the communicator 302 can transmit and/or receive data, signal strengths of respective cells, indicator information (e.g., can receive context indicator or base station identifier), compression context (e.g., RoHC context), identification information, and/or other information to/from a source base station 202 and/or a target base station 206 to facilitate communication associated with the mobile device 116 (e.g., compression context can be established between the mobile device 116 and a base station).

For instance, during an inter-base station handover of the mobile device 116 from the source base station 202 to the target base station 206, the communicator 302 can receive an indicator(s), such as a handover indicator and/or a context indicator, from the source base station 202 that can indicate whether an inter-base station handover or intra-base station handover is occurring, and/or can specify whether the source base station 202 has or is transmitting certain compression context (e.g., RoHC static and semi-static context) to the target base station 206. Based at least in part on the received indicator(s), the mobile device 116 can determine the type of handover and/or whether and to what extent compression context was or is being transmitted by the source base station 202 to the target base station 206 prior to or during the handover. For example, a received indicator can be set to indicate to the mobile device 116 that the handover is an inter-base station handover to a target cell 208 of a target base station 208, wherein compression context is to be re-established, and can further specify that the source base station 202 is sending the compression static and semi-static context to the target base station 206 during handover of the mobile device 116 to the target base station 206. The mobile device 116 can determine, based at least in part on such received indicator, that the compression static and semi-static context will already be established between the mobile device 116 and the target base station 206 and, after handover, the mobile device 116 will only have to establish the compression dynamic context to finish setting up full compression context with the target base station 206. The communicator 302 can facilitate compression dynamic context transfer between the mobile device 116 and the target base station 206 to finish establishing compression context with the target base station 206.

In another aspect, the mobile device 116 also can include a detector 304 that can detect, monitor, and/or measure the signal strength of, one or more cells (e.g., source cell 204, target cell 208, another cell(s)) located in the vicinity of the mobile device 116. The communicator 302 can transmit information related to the detected cells to a serving cell (e.g., source cell 204) to facilitate determinations relating to handovers. The mobile device 116 can comprise a selector 306 that can facilitate selecting or switching to a desired cell (e.g., target cell 208) of a desired base station (e.g., target base station 206) with which communication by the mobile device 116 can be facilitated based at least in part on a message received from a cell (e.g., source cell 204) of a serving base station (e.g., source base station 202) indicating the selection or switching of the mobile device 116 to the desired cell.

In still another aspect, the mobile device 116 can include a compressor 308 that can facilitate compressing and/or decompressing data, header information, etc., to facilitate efficient communication by the mobile device 116 in a wireless communication environment. In accordance with an embodiment, the compressor 308 can comprise a RoHC engine that can employ RoHC to facilitate compression and/or decompression of information (e.g., compression of information to be transmitted; decompression of information that is received), such as header information (e.g., IP header, UDP header, RTP header), for example, when the RoHC context is established, or at least partially established (e.g., RoHC static and semi-static context is established) between the mobile device 116 and a base station (e.g., target base station 206).

In another aspect, the mobile device 116 can comprise a data store 310 that can store information, such as data, indicator information, compression context (e.g., RoHC context), signal strength, identification information, neighbor cell lists, and/or other information, related to base stations (e.g., source base station 202, target base station 206) and cells (e.g., source cell 204, target cell 208), and/or information related to the mobile device 116 and communication in the wireless communication environment. For instance, when an inter-base station handover of the mobile device from the source cell 204 of the source base station 202 to the target cell 208 of a target base station 206 occurs, the mobile device 116 can retrieve information, such as a certain portion of compression context (e.g., RoHC dynamic context) from the data store 310 and transmit the retrieved information, or a portion thereof, to the target base station 206 to facilitate establishing compression context with the target base station 206.

In accordance with an aspect, the data store 310 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 310 is intended to comprise, without being limited to, these and any other suitable types of memory.

Figure 4:
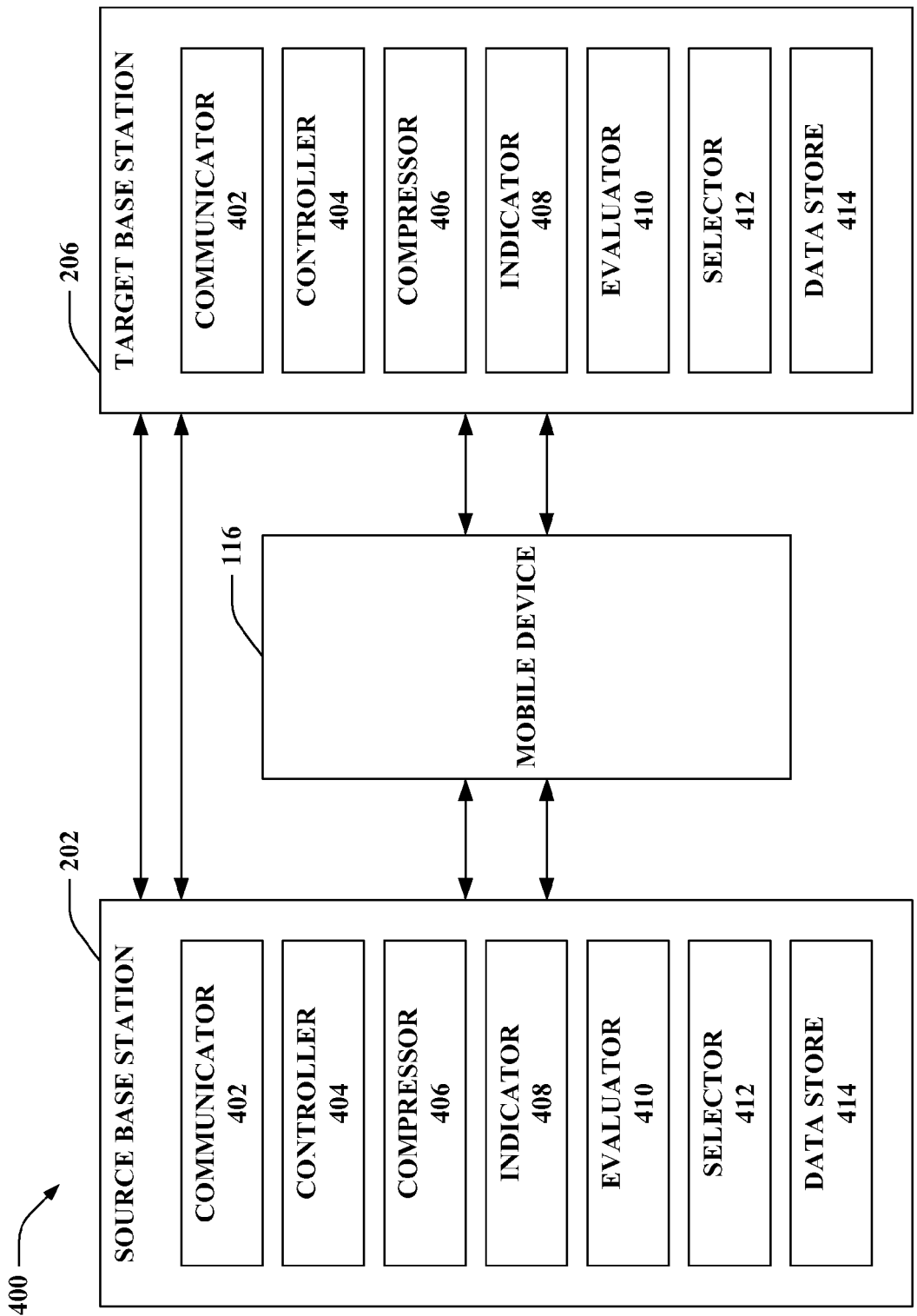
FIG. 4 is a depiction of an example system that can facilitate compression context transfer from a source base station to a target base station to facilitate communication associated with a mobile device in accordance with an aspect of the disclosed subject matter.

Turning to FIG. 4, illustrated is an example system 400 that can facilitate compression context transfer from a source base station to a target base station to facilitate communication associated with a mobile device in accordance with an aspect of the disclosed subject matter. System 400 can comprise a source base station 202 that can be a base station serving and in connection with a mobile device 116 in a wireless communication environment. The source base station 202 can include a source cell 204 (not shown in FIG. 4) that can be the cell that is serving and in connection with the mobile device 116. The system 400 also can include a target base station 206 that can be a base station to which the mobile device 116 can be handed over to, for instance, when a cell (e.g., target cell 208) of the target base station 206 is desired over the current serving cell (e.g., source cell 204). In such instance, the mobile device 116 can be handed over to the target cell 208 (not shown in FIG. 4) from the source cell 204. Also, the source base station 202 and/or target base station 208 can communicate with another base station(s), a cell(s), and/or any disparate devices (e.g., servers) (not shown) that can perform functions such as, for example, authentication, authorization, etc. It is to be appreciated and understood that the mobile device 116, source base station 202, source cell 204, target base station 206, and target cell 208, each can be the same or similar as, and/or can comprise the same or similar functionality as, respective components, such as more fully described herein, for example, with regard to system 100, system 200, and system 300.

Mobile device 116 can be communicatively connected (e.g., wirelessly connected) with the source base station 202, where the connection can comprise a data channel and a control channel, for example. In one aspect, the source base station 202 can transmit and/or receive information to from the mobile device 116, where the information can include, for example, indicator information (e.g., transmit context indicator), handover commands, respective signal strengths of cells, compression context information (e.g., RoHC context), and/or other information, associated with the source base station 202, mobile device 116, target base station 206, or other components or devices associated with system 400.

In one aspect, the source base station 202 can include a communicator 402 that can facilitate communication of information between the source base station 202 and the mobile device 116, and/or between the source base station 202 and the target base station 206, and/or between the base station and other components or devices (not shown) associated with system 400. For instance, during an inter-base station handover of the mobile device 116 to a target cell 208 of the target base station 206, the communicator 402 can facilitate transmitting a desired portion of compression context (e.g., compression static and semi-static context) from the source base station 202 to target base station 206. The communicator 402 also can facilitate transmitting one or more indicators (e.g., handover indicator, context indicator) to the mobile device 116 that can indicate whether a handover is inter-base station or intra-base station, and/or can indicate whether compression context, and/or what portion of compression context, was transmitted by the source base station 202 to the target base station 206 prior to or during the handover.

In another aspect, the source base station 202 can comprise a controller 404 that can comprise one or more processors, microprocessors, and/or controllers that can facilitate analyzing information and/or generating information for transmission, and/or can control one or more components of the source base station 202. In one aspect, the controller 404 can comprise a regional node controller (RNC) that can employ various protocols, such as data compression (e.g., ROHC), for example.

In yet another aspect, the source base station 202 can contain a compressor 406 that can facilitate compressing and/or decompressing data, header information, etc., to facilitate efficient communication with a mobile device 116 in a wireless communication environment. In accordance with one embodiment, the compressor 406 can comprise a RoHC engine that can employ RoHC to facilitate compression and/or decompression of information (e.g., compression of information to be transmitted; decompression of information that is received), such as header information (e.g., IP header, UDP header, RTP header), for example, when the RoHC context is established, or at least partially established (e.g., RoHC static and semi-static context is established) between the source base station 202 and the mobile device 116.

In still another aspect, the source base station 202 can include an indicator 408 that can facilitate providing indicator information, such as context indicator or base station identifier, to a mobile device 116 during a handover of the mobile device 116 to a disparate cell (e.g., target cell 208). The indicator information can facilitate enabling the mobile device 116 to determine whether, and to what extent, the source base station 202 is transmitting or has transmitted compression context information (e.g., compression static and semi-static context) to the target base station 206 (e.g., target cell 208 of the target base station 206) in order to facilitate establishing compression context between the mobile device 116 and the target cell 208.

In yet another aspect, the source base station 202 can comprise an evaluator 410 that can analyze or evaluate information, such as compression context information, to facilitate establishing compression context between the source base station 202 and the mobile device 116. The evaluator 410 also can perform other evaluation functions, such as evaluating respective signal strengths of cells based in part on received signal strength information to facilitate determinations regarding whether to handover the mobile device 116 to a target cell 208. The source base station 202 can further include a selector 412, and the evaluator 410 can provide results from the evaluation(s) of signal strengths to the selector 412. The selector 412 can determine whether the mobile device 116 is to be handed over to another cell (e.g., target cell 208) or the serving cell (e.g., source cell 204) of the source base station 202 is to continue serving the mobile device 116, and can select a desired cell, if it is determined that a hand off is to occur, based at least in part on predefined selection criteria (e.g., level of signal strength of a cell as compared to other cells; type of base station; respective locations of cells relative to the mobile device; etc.).

In still another aspect, the source base station 202 can contain a data store 414 that can store information, such as data, indicator information, compression context (e.g., RoHC context), signal strength information, identification information, neighbor cell lists, and/or other information, related to a base station(s) (e.g., source base station 202, target base station 206), information related to the mobile device 116, and/or information otherwise related to communication in the wireless communication environment. For instance, when an inter-base station handover of the mobile device 116 from the source cell 204 of the source base station 202 to the target cell 208 of a target base station 206 occurs, the source base station 202 can retrieve information, such as compression context (e.g., compression static and semi-static context) related to the mobile device 116 from the data store 414 and transmit the retrieved information, or a portion thereof, to the target base station 206 to facilitate establishing compression context between the target base station 206 and the mobile device 116. Further, the source base station 202 can retrieve indicator information from the data store 414 based at least in part on whether and to what extent the source base station 202 is transmitting or has transmitted compression context information to the target base station 206, and can transmit the indicator information to the mobile device 116 to facilitate establishing compression context between the target base station 206 and the mobile device 116.

In accordance with an aspect, the data store 414 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 414 is intended to comprise, without being limited to, these and any other suitable types of memory.

In yet another aspect, the target base station 206 can comprise the communicator 402, controller 404, compressor 406, indicator 408, evaluator 410, selector 412, and data store 414 that each have the same or similar functionality as more fully described herein, for example, with regard to respective components of system 100, system 200, system 300, and system 400 (e.g., respective components of the source base station 202). For instance, the communicator 402 of target base station 206 can receive specified compression context (e.g., compression static and semi-static context) from the source base station 202 during a handover of the mobile device 116 from the source cell 204 to the target cell 208 of the target base station 206. The controller 404 of target base station 206 can facilitate application of the received compression context to facilitate establishing the compression context, or a portion thereof, based on the received portion of context. The evaluator 410 of target base station 206 can facilitate determining whether context is completely established, and if it is not, can facilitate determining the remaining context that is desired to be established. The communicator 402 of the target base station 206 also can facilitate communication of remaining compression context (e.g., compression dynamic context) to be established between the target base station 206 and the mobile device 116.

Figure 5:
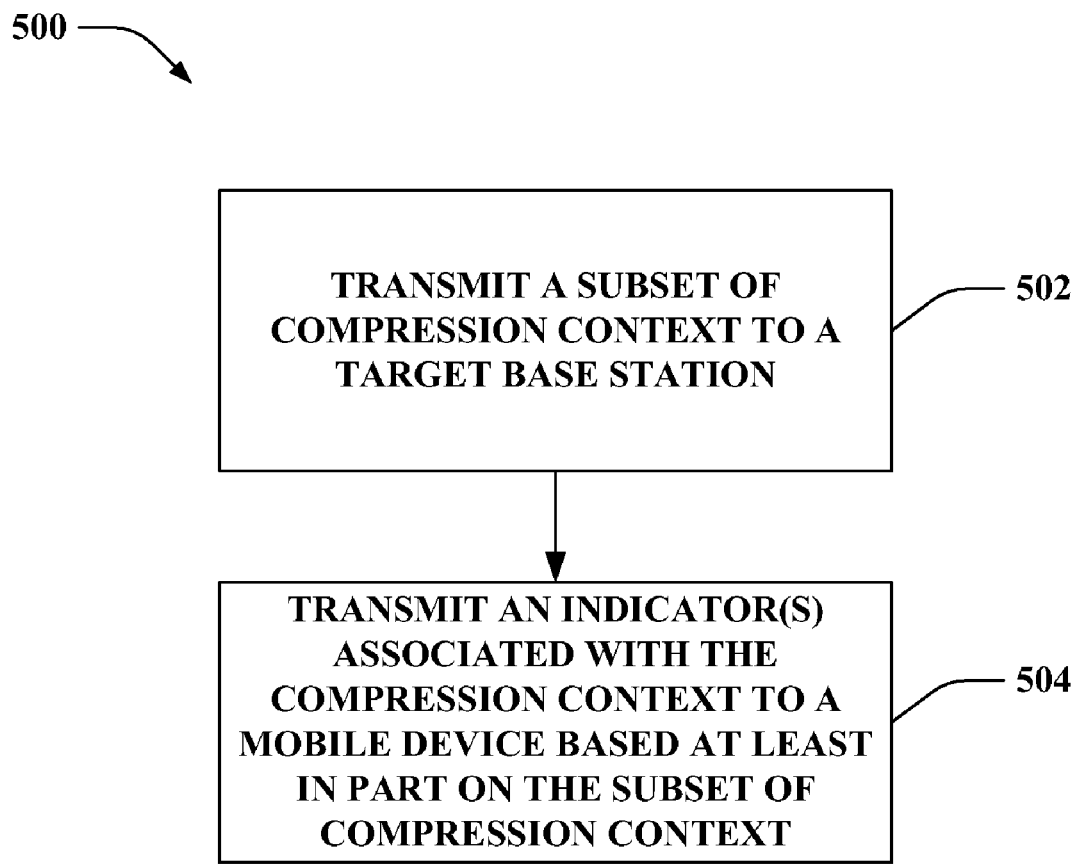
FIG. 5 is a depiction of an example methodology that can facilitate transmitting desired compression context to a target base station during a handover of a mobile device to the target base station to facilitate communications associated with the mobile device in a wireless communication system in accordance with an aspect of the disclosed subject matter.
Figure 6:
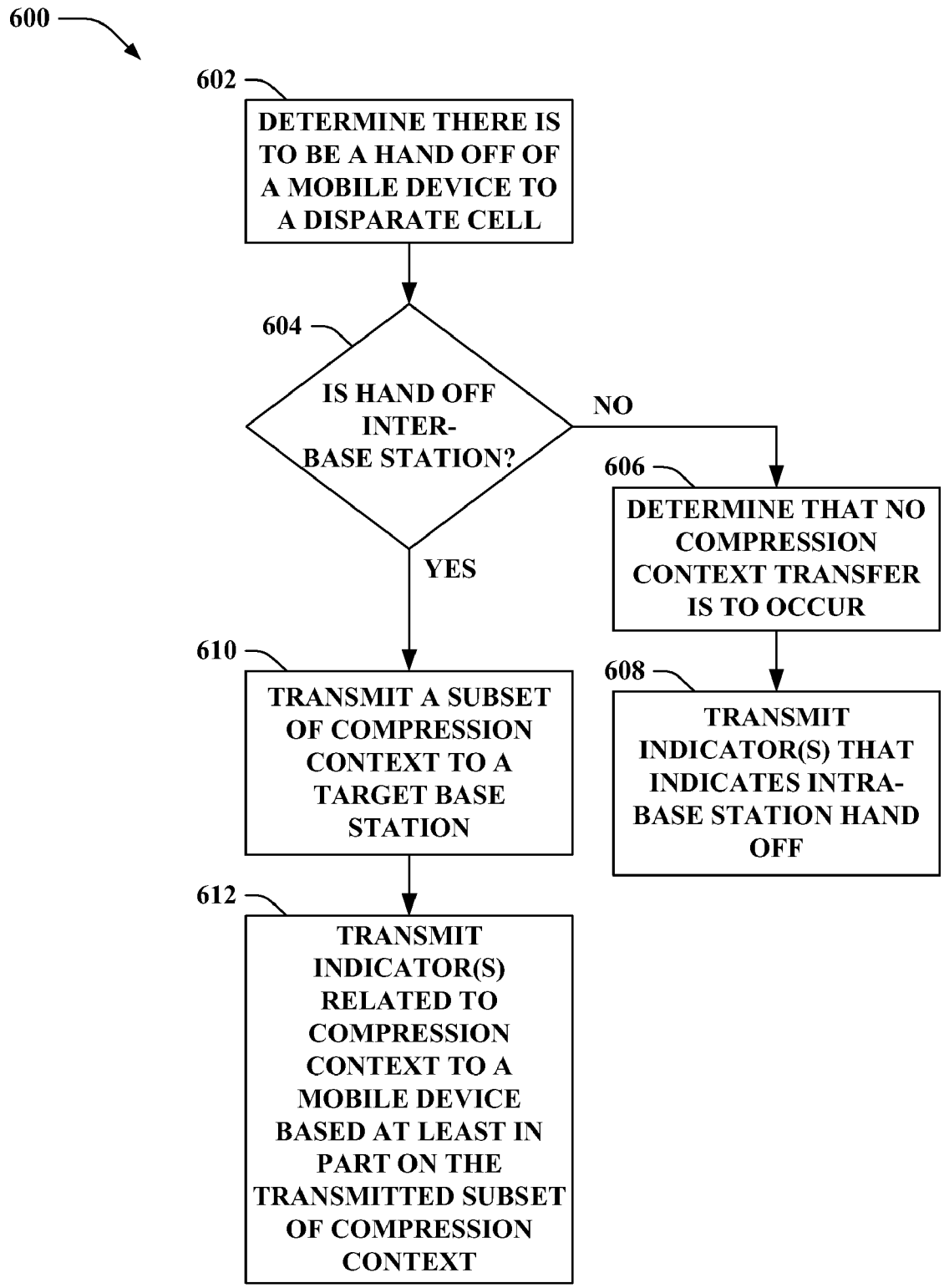
FIG. 6 is an illustration of another example methodology that can facilitate transmitting desired compression context to a target base station during a handover of a mobile device to the target base station to facilitate communications associated with the mobile device in a wireless communication system in accordance with an aspect of the disclosed subject matter.
Figure 7:
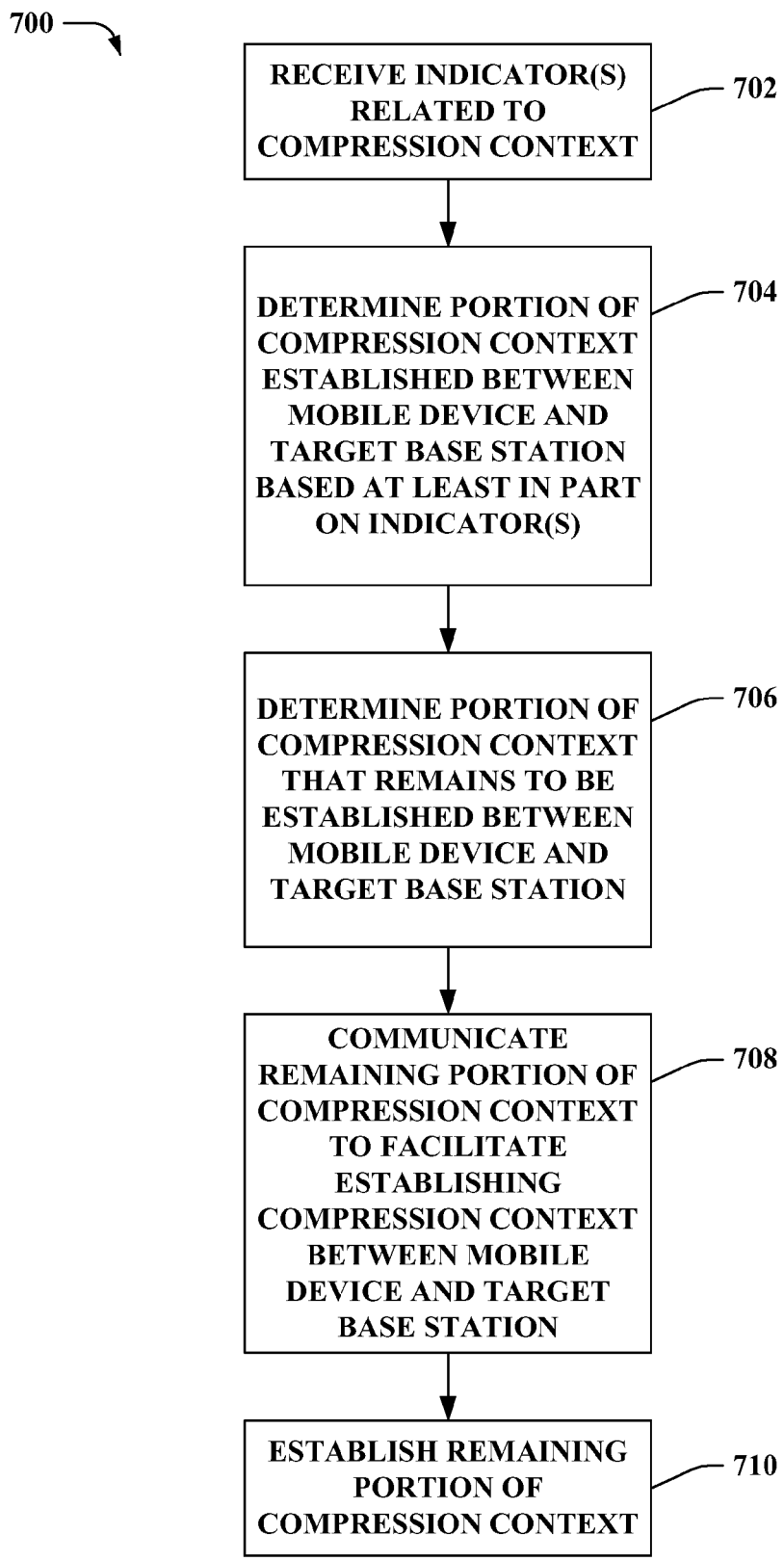
FIG. 7 is an illustration of an example methodology that can facilitate transmitting desired compression context to a target base station during a handover of a mobile device to the target base station to facilitate communications associated with the mobile device in a wireless communication system in accordance with an aspect of the disclosed subject matter.

Referring to FIGS. 5-7, methodologies relating to efficiently establishing compression context between a mobile device and base station (e.g., target base station 206) and providing an indicator(s) regarding whether and to what extent a source base station 202 transmitted compression context to a target base station 206 to facilitate establishing the desired compression context after handover of the mobile device (e.g., 116) to a base station (e.g., target base station 206) in order to facilitate communication by the mobile device in a network (e.g., base station, core network) are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that can facilitate transmitting desired compression context (e.g., RoHC context) to a target base station during a handover of a mobile device to the target base station to facilitate communications associated with the mobile device in a wireless communication system in accordance with an aspect of the disclosed subject matter. At 502, a subset of compression context can be transmitted to a target base station (e.g., 206). In one aspect, a source base station 202 can transmit a subset of compression context to the target base station 206 during a handover (e.g., inter-base station handover) of the mobile device 116 from a source cell 204 of the source base station 202 to a target cell 208 of a target base station 206 to facilitate establishing context (e.g., RoHC context) between the mobile device 116 and the target base station 206. The subset of compression context can comprise a desired portion of compression context (e.g., RoHC static and semi-static context), or can comprise full compression context.

At 504, one or more indicators associated with compression context can be transmitted. In accordance with an aspect, the source base station 202 can transmit an indicator(s) (e.g., handover indicator and/or context indicator), related to the handover and/or compression context, to the mobile device 116 during a handover of the mobile device 116 from the source cell 204 to the target cell 208. The indicator(s) can specify, to the mobile device 116, whether the handover is inter-base station or intra-base station and/or what compression context was transmitted by the source base station 202 to the target base station 206 as part of the handover. The mobile device 116 can receive the indicator(s), and, based at least in part on the indicator(s), the mobile device 116 can facilitate determining whether compression context is to be re-established after handover, and, if so, what compression context remains to be established between the mobile device 116 and the target base station 206 after handover.

For instance, during an inter-base station handover, the source base station 202 can transmit compression static and semi-static context to the target base station 206. The source base station 202 also can transmit an indicator to the mobile device 116 that can indicate the handover is an inter-base station handover and can further specify that the source base station 202 transmitted the compression static and semi-static context to the target base station 206, which can enable the mobile device 116 to determine that the mobile device only has to establish the remaining compression context (e.g., compression dynamic context) and does not have to establish compression static and semi-static context with the target base station 206. In another aspect, the target base station 206 can establish the compression static and semi-static context based at least in part on the received subset of compression context, and the target base station 206 can begin using that received compression static and semi-static context to facilitate compressing data packets for transmission to the mobile device 116. The mobile device 116 can decompress the received data packets comprising compressed information and can process the received information accordingly (e.g., if the information relates to compression dynamic context, the mobile device 116 can use such information to facilitate establishing the compression dynamic context between the mobile device 116 and the target base station 206).

Referring to FIG. 6, depicted is another methodology 600 that can facilitate transmitting desired compression context (e.g., RoHC context) to a target base station during a handover of a mobile device to the target base station to facilitate communications associated with the mobile device in a wireless communication system in accordance with an aspect of the disclosed subject matter. At 602, a determination can be made to hand off a mobile device to a disparate cell. In an aspect, a source base station 202 can determine that the mobile device 116 is to be handed off from a source cell 204 of the source base station 202 to a disparate cell based at least in part on predefined selection criteria.

At 604, a determination can be made as to whether the hand off (e.g., handover) is an inter-base station hand off. In one aspect, the source base station 202 can determine whether the hand off is an inter-base station hand off of the mobile device from the source cell 204 of the source base station 202 to a target cell 208 of a target base station 206. If it is determined that the hand off is not an inter-base station hand off, but rather an intra-base station hand off (e.g., the new cell that will serve the mobile device 116 is also part of the source base station 202), at 606, it can be determined that no compression context transfer is to occur. For instance, if the hand off is not an inter-base station hand off, but is instead an intra-base station hand off, the source base station 202 can determine that it is unnecessary to transmit compression context to the new cell, as the source base station 202 and thus the new cell already has the desired compression context established. As a result, no compression context will be transferred. At 608, an indicator that indicates the hand off is an intra-base station hand off can be transmitted. In one aspect, the source base station 202 can transmit an indicator, such as a handover indicator, to the mobile device 116, where such indicator, can be set to indicate that the hand off is an intra-base station hand off, which can further indicate to the mobile device 116 that compression context will not have to be re-established after handover occurs.

Referring again to reference numeral 604, if, at 604, it is determined that the hand off is an inter-base station hand off, at 610, a desired subset of compression context can be transmitted to the target base station. For example, the desired subset of compression context can comprise compression static and/or semi-static context, or alternatively, can comprise the full compression context. Prior to or during the handover of the mobile device 116 from the source cell 204 to the target cell 208, the source base station 202 can transmit the desired subset of compression context to the target base station 206 to facilitate efficiently establishing the compression context between the mobile device 116 and the target base station 206 prior to or during the handover.

At 612, an indicator(s), which can be based at least in part on the transmitted subset of compression context, can be transmitted to the mobile device. In one aspect, during the handover of the mobile device 116 to the target cell 208, the source base station 202 can transmit an indicator(s) that can indicate to the mobile device 116 that the hand off is an inter-base station hand off and can also specify what portion of compression context was included in the subset of compression context that was transmitted from the source base station 202 to the target base station 206. As desired, the indicator(s) can be included in a handover message and/or in a disparate message, from the source base station 202 to the mobile device 116. For instance, if the subset of compression context comprised compression static and semi-static context, the indicator(s) transmitted to the mobile device 116 can specify the subset of compression context comprised compression static and semi-static context. Based at least in part on the received indicator(s), the mobile device 116 can determine that the handover is an inter-base station handover and that compression static and semi-static context is already established between the target base station 206 and the mobile device 116. The mobile device 116 can further determine that only the compression dynamic context has to be established to finish establishing the full compression context between the target base station 206 and mobile device 116 to facilitate efficient communication by the mobile device 116 in the wireless communication environment.

FIG. 7 illustrates yet another methodology 700 that can facilitate transmitting desired compression context to a target base station during a handover of a mobile device to the target base station to facilitate communications associated with the mobile device in a wireless communication system in accordance with an aspect of the disclosed subject matter. At 702, an indicator(s) related to compression context can be received. In an aspect, the mobile device 116 can receive an indicator(s) (e.g., handover indicator, context indicator), related to the handover and/or compression context (e.g., RoHC context), from a source base station 202 in regard to the handover, such as an inter-base station handover, of the mobile device 116 from the source cell 204 of the source base station 202 to a target cell 208 of the target base station 206. The indicator(s) can provide information to the mobile device 116 regarding whether the handover is an inter-base station handover or intra-base station handover and/or whether and to what extent compression context is being transmitted or has been transmitted by the source base station 202 to the target base station 206 prior to or during the handover to facilitate establishing at least a portion of the compression context between the mobile device 116 and target base station 206 prior to or during the handover. For instance, an indicator can be set to indicate that the handover is an inter-base station handover and can further specify that the source base station 202 has transmitted compression static and semi-static context to the target base station 206 during the handover period (e.g., period between transmission of the handover command to the mobile device 116 and the time for handover of the mobile device 116 to the target base station 206).

At 704, the portion of compression context established between the mobile device and the target base station can be determined. In one aspect, the mobile device 116 can determine the portion of compression context that has been established based at least in part on the received indicator(s), which can indicate the portion of compression context transmitted by the source base station 202 to the target base station 206. The target base station 206 can begin to establish the desired compression context using the portion of the compression context received from the source base station 202, during the handover period. For instance, when compression static and semi-static context is received from the source base station 202, the target base station 206 can establish the compression static and semi-static context between the mobile device 116 and target base station 206. By at least partially establishing the compression context, the target base station 206 can begin compressing data packets (e.g., compressing at least a portion of the data packets) and transmitting the compressed data packets to the mobile device 116 to facilitate finishing establishing the compression context between the mobile device 116 and target base station 206, where the information in the compressed data packets can facilitate establishing the portion of compression context that remains to be established (e.g., compression dynamic context).

At 706, the portion of the context that remains to be established can be determined. In accordance with an aspect, the mobile device 116 can determine the compression context, if any, that remains to be established between the mobile device 116 and the target base station 206, based at least in part on the received indicator(s), after the handover of the mobile device 116 to the target base station 206. For instance, if and when the source base station transmits an indicator to the mobile device 116 indicating that the source base station 202 has transmitted compression static and semi-static context to the target base station 206 prior to or during handover, the mobile device 116 can analyze the received indicator and can determine the portion of compression context that remains to be established with the target base station 206 after handover.

At 708, the remaining portion of compression context can be communicated to facilitate establishing compression context between the mobile device 116 and the target base station 206. After handover, the mobile device 116 and target base station 206 can communicate with each other to establish the compression context that remains to be established (e.g., compression dynamic context). As the compression static and semi-static context can already be established during the handover period, after handover, data packets can be compressed (e.g., at least certain data packets can be compressed) based at least in part on the portion of compression context already established, and the compressed data packets can be transmitted between the mobile device 116 and target base station 206 to facilitate efficiently establishing the portion of compression context that remains to be established.

At 710, the remaining portion of compression context (e.g., portion of compression context that is not yet established) can be established. In one aspect, after handover, the mobile device 116 and target base station 206 can communicate to facilitate establishing the remaining portion of the compression context to be established during a handover of the mobile device from a source cell 204 of a source base station 202 to a target cell 208 of a target base station 206 (e.g., inter-base station handover). For instance, if prior to or during the handover, the source base station 202 transmitted compression static and semi-static context to the target base station 206, and transmitted an indicator to the mobile device 116 that indicates compression static and semi-static context was transmitted to the target base station 206 and is established at the target base station 206, the mobile device 116 can determine that the remaining portion of compression context to be established is compression dynamic context. After handover, the mobile device 116 and target base station 206 can communicate with each other to facilitate establishing the compression dynamic context. In one aspect, with the compression static and semi-static context established prior to or during handover, the target base station 206 can compress data packets (e.g., at least a portion of the data packets) transmitted to the mobile device 116 to facilitate efficiently establishing the remaining portion of compression context.

It is to be appreciated and understood that the indicator can indicate that no compression context was transmitted, a portion of the context was transmitted (e.g., compression static and/or semi-static context transmitted), or full compression context (e.g., compression static, semi-static, and dynamic context transmitted) was transmitted, from the source base station 202 to the target base station 206 during handover, as desired. Further, the indication of no compression context transferred can be further delineated to indicate that no compression context was transferred because the handover is an intra-base station handover or because no compression context was transferred for another reason in relation to an inter-base station handover. The mobile device 116 can analyze the received indicator information and can take appropriate action to facilitate establishing any compression context that remains to be established, if any, after handover.

It will be appreciated that, in accordance with one or more aspects described herein, inferences can be made relating to compression context transfer by a source base station to a target base station to facilitate establishing compression context between the target base station and a mobile device to facilitate communication associated with the mobile device in the network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, one or more methods presented above can include making an inference(s) pertaining to whether compression static and/or semi-static context was transferred by a source base station to a target base station during handover of a mobile device to the target base station; what portion of compression context was transferred by a source base station to a target base station during handover of a mobile device to the target base station; what portion of compression context remains to be established after handover after handover of a mobile device to the target base station; and/or whether information can be compressed for transmission between a target base station and a mobile device. It will be appreciated that the foregoing examples are illustrative in nature and are not intended to limit the number of inferences that can be made or the manner in which such inferences are made in conjunction with the various embodiments and/or methods described herein.

FIGS. 8-15 and the tables herein disclosed relate to example information and/or example results related to RoHC, compression static and/or semi-static context transfer, and the impact of transfer of compression static and/or semi-static context by a source base station to a target base station during handover of a mobile device to the target base station. In one aspect, after compression context (or at least partial compression context) has been established between the mobile device 116 and the target base station 206, the compressor of the mobile device 116 and compressor of the target base station 206 can compress/decompress data transmitted/received. The RoHC engine can facilitate efficient compression of information, such as header information (e.g., IP header, UDP header, RTP header). For example, with regard to the RoHC RTP profile, there can be 2 or 3 IR packets, as desired. An IR packet for Internet Protocol version 4 (IPv4) can contain 40 bytes of data, and an IR packet for Internet Protocol version 6 (IPv6) can contain 60 bytes of data. There also can be a UOR2 Ext 3 data packet, which can contain 8 bytes of data, for example.

The total size of data for the RoHC RTP profile can be (IR packet size×the number of IR data packets)+(size of the UOR2 Ext 3 data packet×number of UOR2 Ext 3 data packets). Depicted in Table 1 are some example RoHC context sizes for RoHC RTP profile.

TABLE 1

| IP | Number of IR packets | RoHC context (bytes) |
|---|---|---|
| v4 | 2 | 88 |
| v4 | 3 | 128 |
| v6 | 2 | 128 |
| v6 | 3 | 188 |

If a source base station 202 transmits RoHC static context and semi-static context to a target base station 206 during an inter-base station handoff of a mobile device 116 to the target base station 206, there can be a significant reduction in the average bytes per handoff, for example, with regard to VoIP traffic. An example of the reduction in average bytes per handoff for VoIP traffic is illustrated in Table 2, where Table 2 can facilitate demonstrating the impact of compression static context transfer (e.g., transfer of compression static context by source base station to target base station) with regard to RTP profile.

TABLE 2

|  | No context transfer (bytes) | Static context transfer (bytes) |
|---|---|---|
| IPv6, num_IR = 2 | 128 | 56 |
| IPv6, num_IR = 3 | 188 | 80 | where num_IR refers to the number of IR data packets employed.

Figure 8:
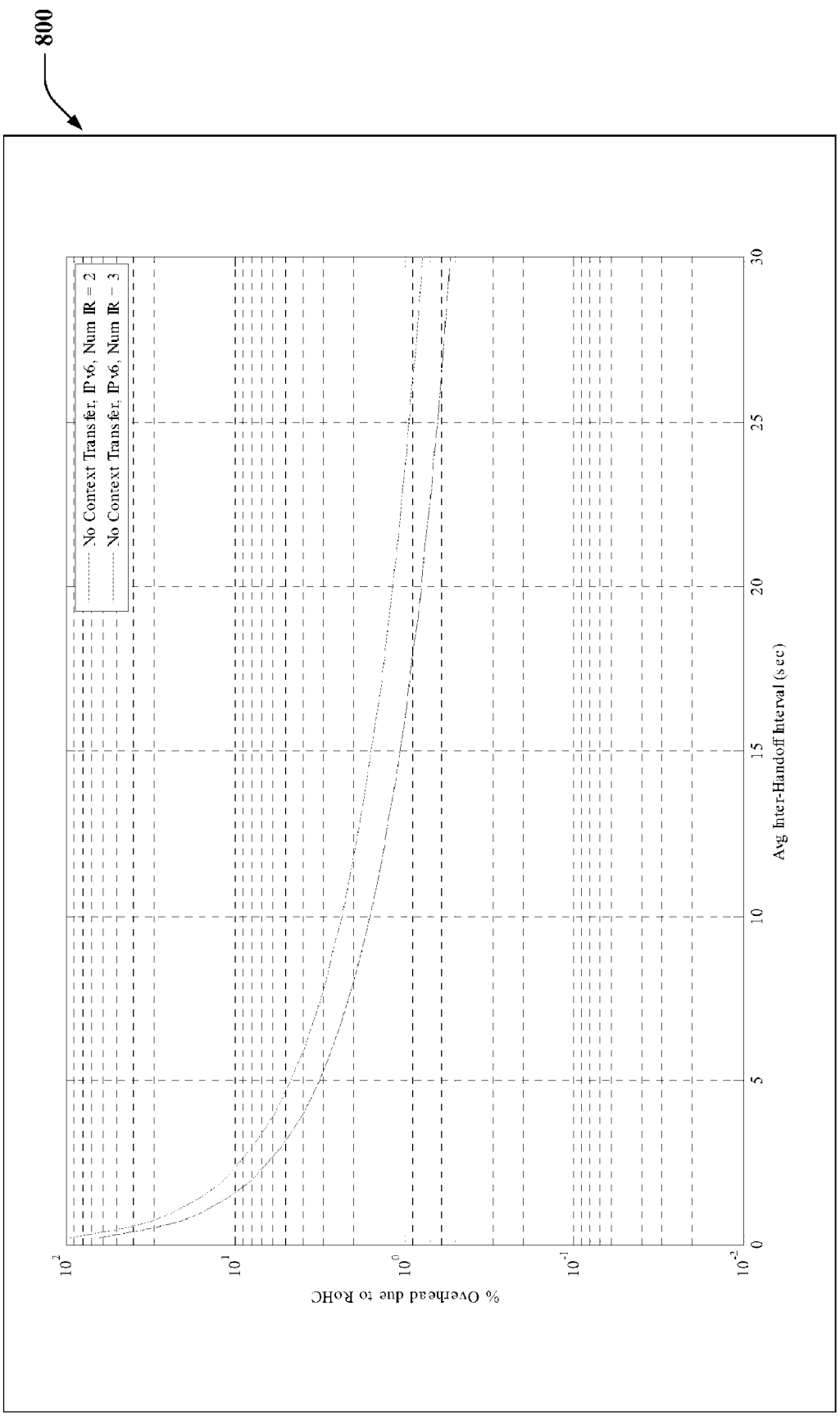
FIG. 8 depicts an example graph of analytical air-interface overhead due to Robust Header Compression (ROHC) context re-establishment at handovers of a mobile device from one base station to another base station.

Referring to FIG. 8, illustrated is an example graph 800 of analytical air-interface overhead due to RoHC context re-establishment at handovers of a mobile device from one base station to another base station. The RoHC overhead is calculated as a percentage of the bytes per AMR 12.2 kbps VoIP packet in the absence of handoff.

Figure 9:
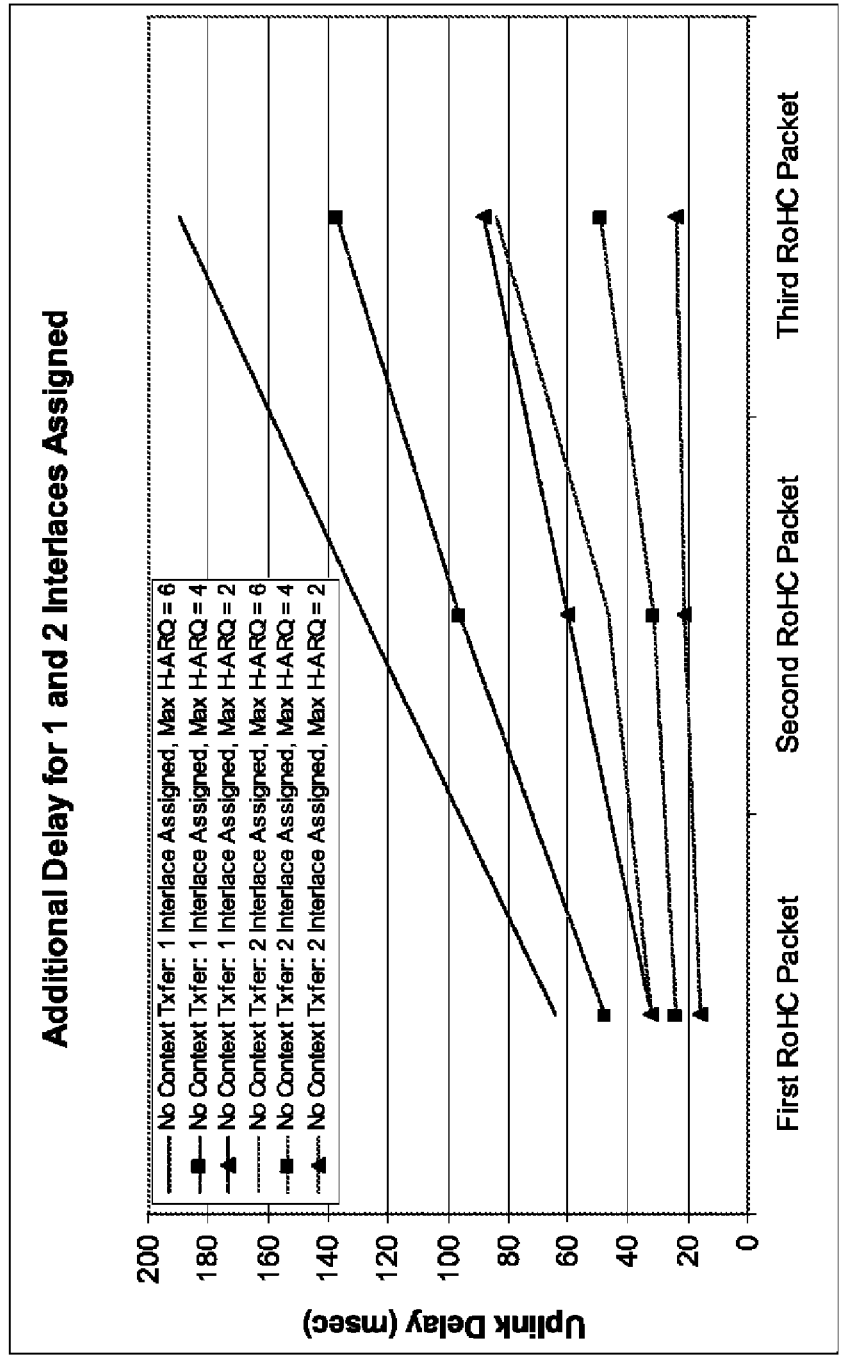
FIG. 9 illustrates an example graph related to additional uplink VoIP latency compared to RoHC at access gateway (aGW).
Figure 10:
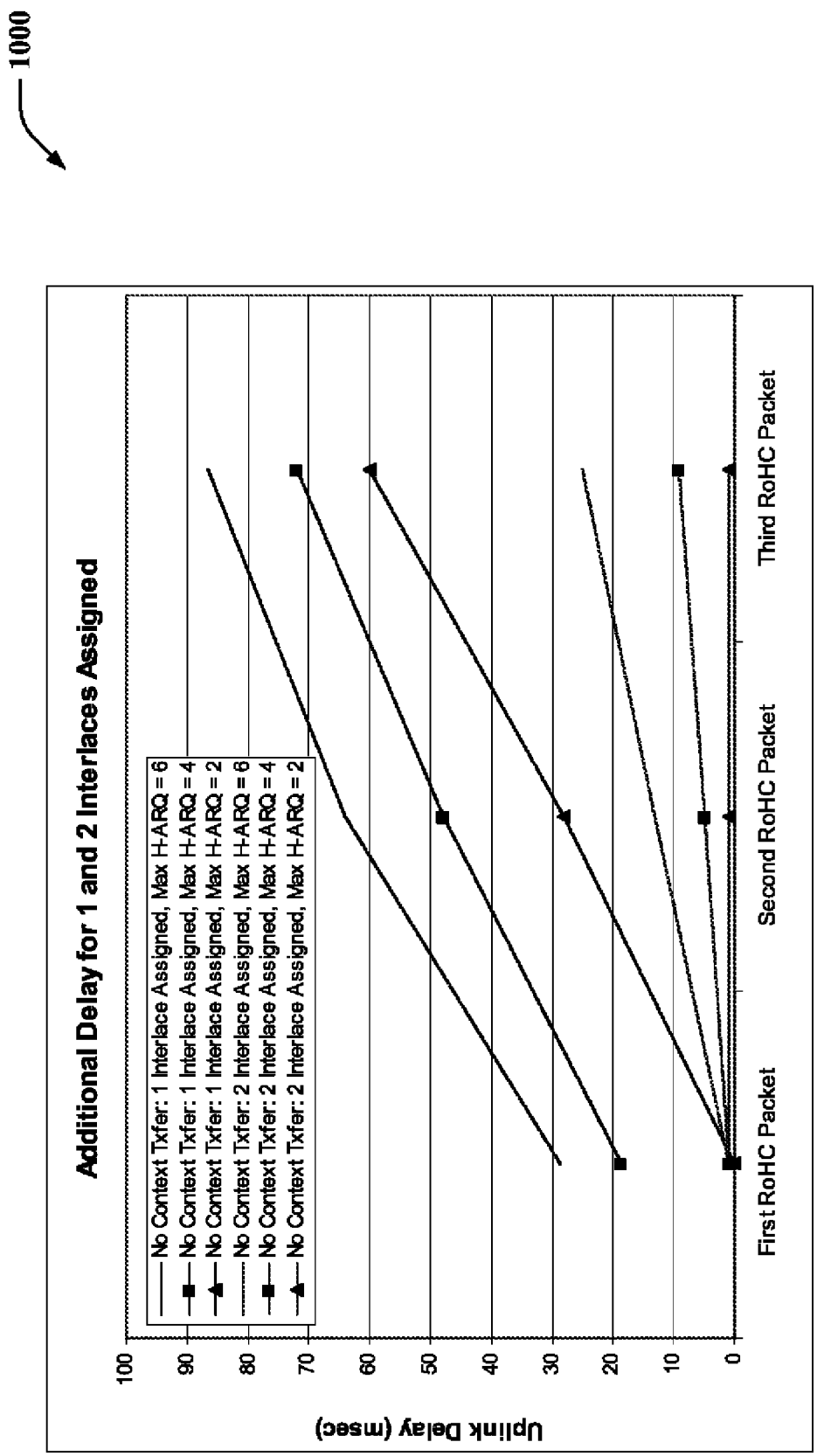
FIG. 10 illustrates an example graph of additional uplink gaming latency compared to RoHC at aGW.

FIG. 9 depicts an example graph 900 related to additional uplink VoIP latency compared to RoHC at access gateway (aGW). The graph 900 shows respective additional latencies with 1 and 2 interlaces assigned. Referring to FIG. 10, illustrated is an example graph 1000 of additional uplink gaming latency compared to RoHC at aGW. Graph 1000 is based in part on a gaming model of a first person shooter. Graph 1000 is also based in part on a mean application packet size of 42 bytes and a mean inter-arrival time of 51 ms. With regard to graph 900 and graph 1000, certain assumptions are made, such as there are 8 interlaces on uplink; 1 or 2 interlaces assigned to the mobile device, where for VoIP traffic there are 320 bits per VoIP packet and for gaming traffic there are 336 application bits per gaming packet; no additional requests by the mobile device or assignments from the base station for larger packet sizes due to RoHC context re-establishment as a result of handovers, wherein latency increase is calculated assuming no capacity loss; scheduling latency due to packet transmission opportunity alignment with the packet generation by vocoder, wherein mean latency of 10 ms used for analysis; and the number of hybrid automatic repeat request (H-ARQ) transmission for each VoIP is 2, 4, or 6, and termination statistics having equal probability after each sub-packet.

Table 3 depicts example IP headers, UDP headers, and RTP headers that can be employed in accordance with an aspect of the disclosed subject matter:

TABLE 3

| | Static Context | Semi-Static Context | Dynamic Context | No Transfer Required |
|---|---|---|---|---|
| IPv6 | Version (4 bits) | Traffic Class (8 bits) | | Payload Length (16 bits) |
| | Flow Label (20 bits) | Hop Limit (8 bits) | | |
| | Next Header (8 bits) | | | |
| | Source Address (128 bits) | | | |
| | Destination Address (128 bits) | | | |
| UDP | Source Port (16 bits) | | Checksum (16 bits) | Length (16 bits) |
| | Destination Port (16 bits) | | | |
| RTP | Version (2bits) | Payload Type (7 bits) | Sequence Number (16 bits) | Padding (1 bit) |
| | Extension (1 bit) | | Timestamp (32 bits) | Marker (1 bit) |
| | SSRC (32 bits) | | | CSRC Counter (4 bits) |
| RTP Related | | | TS_STRIDE (32 bits) | |
| | | | TIME_STRIDE (16 bits) | |

It is to be appreciated and understood that, after transfer of compression static context from a source base station 202 to a target base station 206 during an inter-base station handover, where the target base station 206 applies the received compression static context to establish the compression static context, some data packets may not be able to compressed or fully compressed until additional compression context (e.g., compression dynamic context) is established. For example, with regard to an RTP profile, smaller compressed data packets may not be able to be used because such data packets may not have 16 bits for the RTP sequence number (SN). As a result, an IR-DYN packet can be the smallest data packet that can be utilized until additional compression context, where the IR-DYN can be an Initial Refresh-Dynamic packet that can be utilized, for instance, to update any change in the dynamic context.

Table 4 illustrates some example sizes of IR-DYN packets with regard to RTP profile of RoHC (e.g., RoHC v1) for IPv6:

TABLE 4

| | Field Size (bytes) | | | |
|---|---|---|---|---|
| Other | Packet Type (1) | Profile (1) | CRC (1) | |
| IPv6 | Traffic Class (1) | Hop Limit (1) | Extension (1) | |
| UDP | Checksum (2) | | | |
| RTP | V, P, RX, CC (1) | M, PT (1) | RTP SN (2) | RTP TS (4) |

TABLE 4-continued

| Field Size (bytes) | | | |
|---|---|---|---|
| CSRC List (1) | TIS/TSS Flags (1) | TS_STRIDE (4) | TIME_STRIDE (2) |

From Table 4, a typical IR-DYN packet can include 24 bytes of information. An IR-DYN packet potentially can be reduced to 17 bytes of information by transferring TS_STRIDE and TIME_STRIDE as part on compression context transfer from the source base station 202 to the target base station 206 during handover of the mobile device 116 to the target base station 206.

Figure 11:
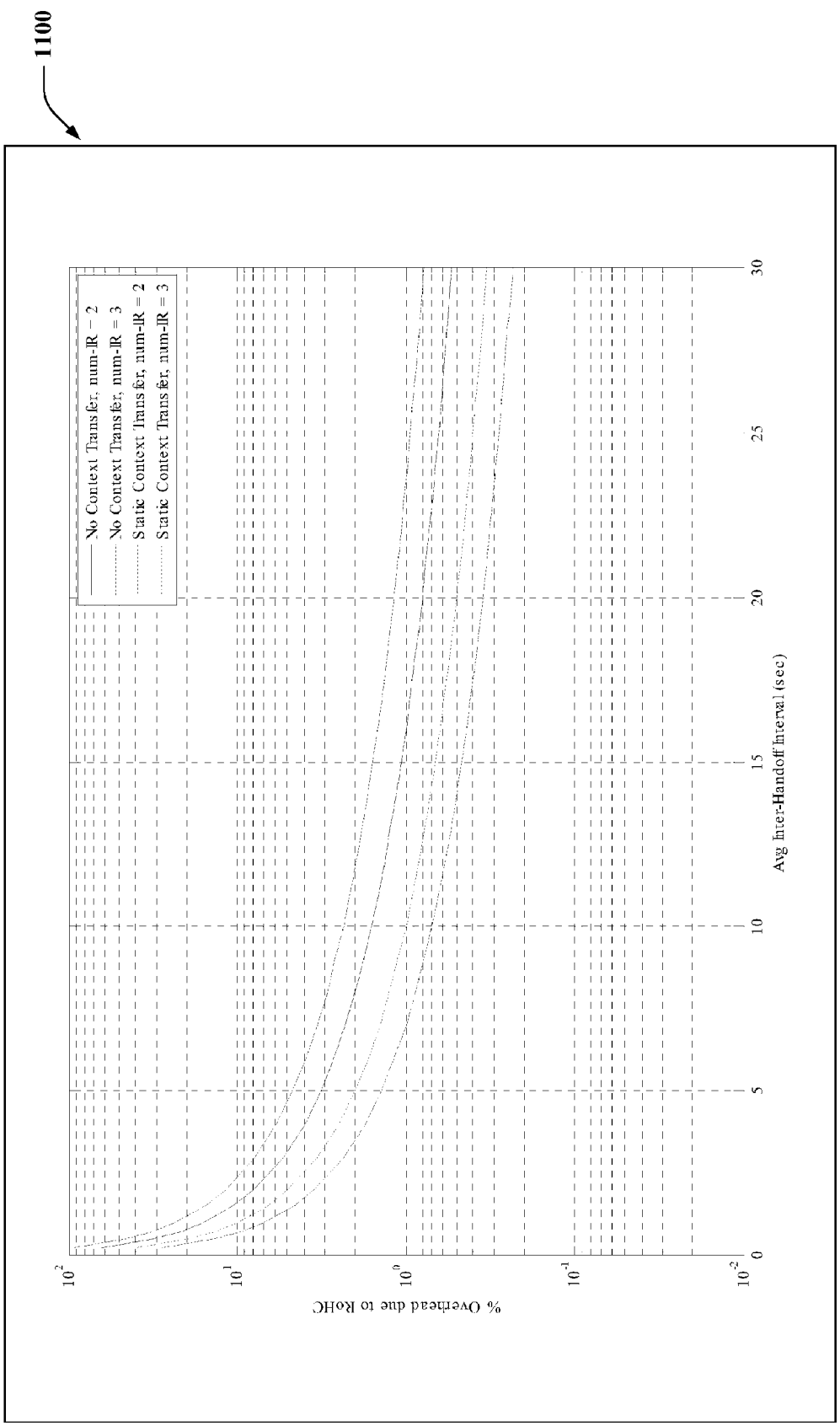
FIG. 11 depicts is an example graph of analytical RoHC overhead for an AMR 12.2 kbps with regard to RTP profile.

Referring to FIG. 11, depicted is an example graph 1100 of analytical RoHC overhead for an AMR 12.2 kbps with regard to RTP profile. RoHC overhead is calculated as a percentage of the bytes per AMR 12.2 k VoIP packet in the absence of handover.

An example of the percentage of additional overhead due to RoHC for adaptive multi-rate (AMR) with regard to RTP profile is illustrated in Table 5, where Table 5 can facilitate demonstrating the impact of compression static context transfer (e.g., transfer of compression static context by source base station to target base station) with regard to RTP profile:

TABLE 5

| | AMR 12.2 kbps No context transfer (%) | AMR 12.2.kbps Static context transfer (%) | AMR 7.95 kbps No context transfer (%) | AMR 7.95 kbps Static context transfer (%) |
|---|---|---|---|---|
| IPv6, num_IR = 2 Inter-handover interval = 5 sec | 3.20 | 1.40 | 4.27 | 1.87 |
| IPv6, num_IR = 3 Inter-handover interval = 5 sec | 4.70 | 2.00 | 6.27 | 2.67 |
| IPv6, num_IR = 2 Inter-handover interval = 2 sec | 8.00 | 3.50 | 10.67 | 4.67 |
| IPv6, num_IR = 3 Inter-handover interval = 2 sec | 11.75 | 5.00 | 15.67 | 6.67 |
| IPv6, num_IR = 2 Inter-handover interval = 1 sec | 16.00 | 7.00 | 21.33 | 9.33 |
| IPv6, num_IR = 3 Inter-handover interval = 1 sec | 23.50 | 10.00 | 31.33 | 13.33 | where num_IR refers to the number of IR data packets employed.

Figure 12:
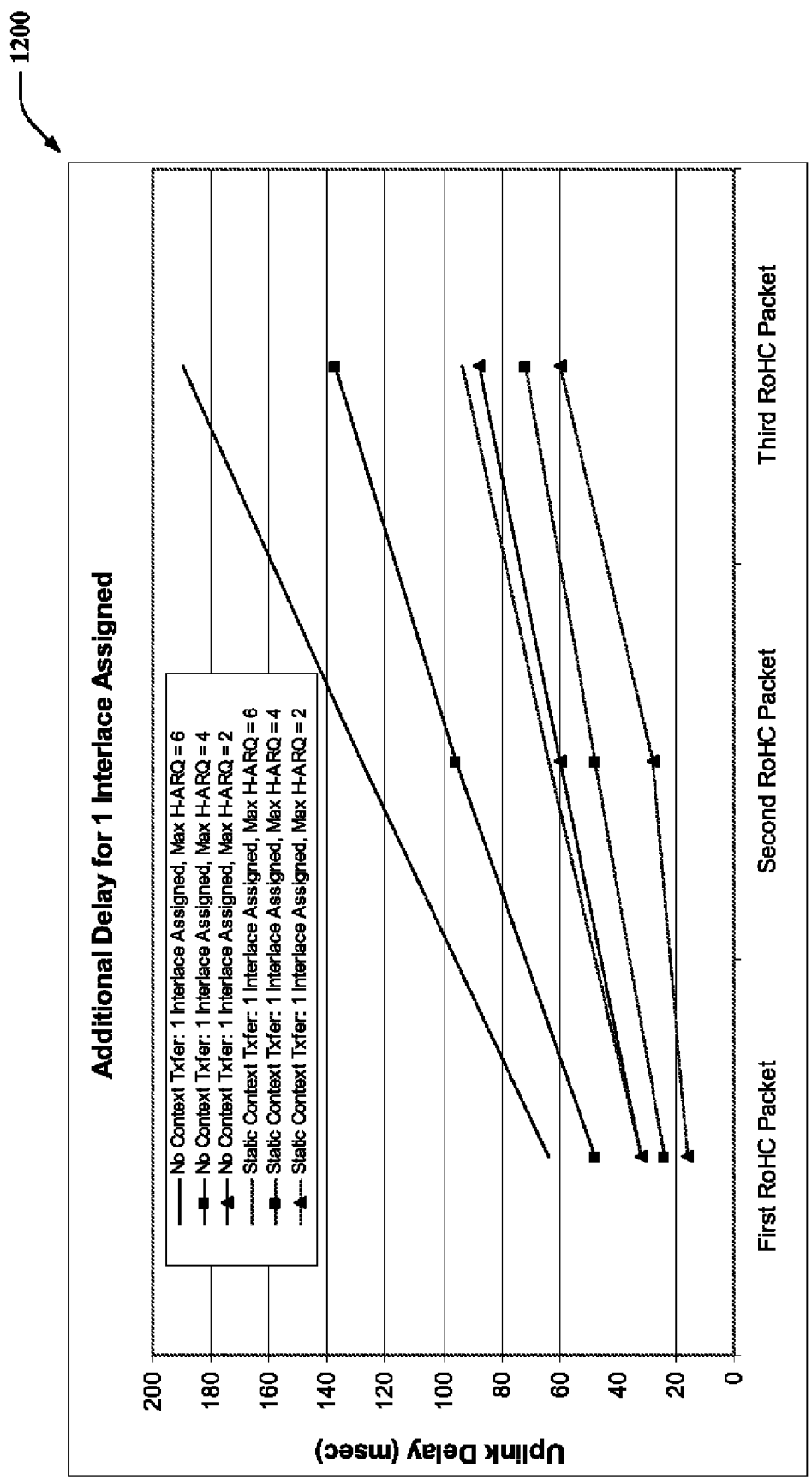
FIG. 12 illustrates an example graph of additional VoIP latency compared to RoHC at aGW with 1 interlace assigned in regard to RTP profile.

Referring to FIG. 12, illustrated is an example graph 1200 of additional VoIP latency compared to RoHC at aGW with 1 interlace assigned in regard to RTP profile. Graph 1200 depicts example latencies for various instances where there is no compression context transfer at handover and various instances where there is compression context transfer at handover (e.g., source base station transfers compression static context to the target base station at handover).

Figure 13:
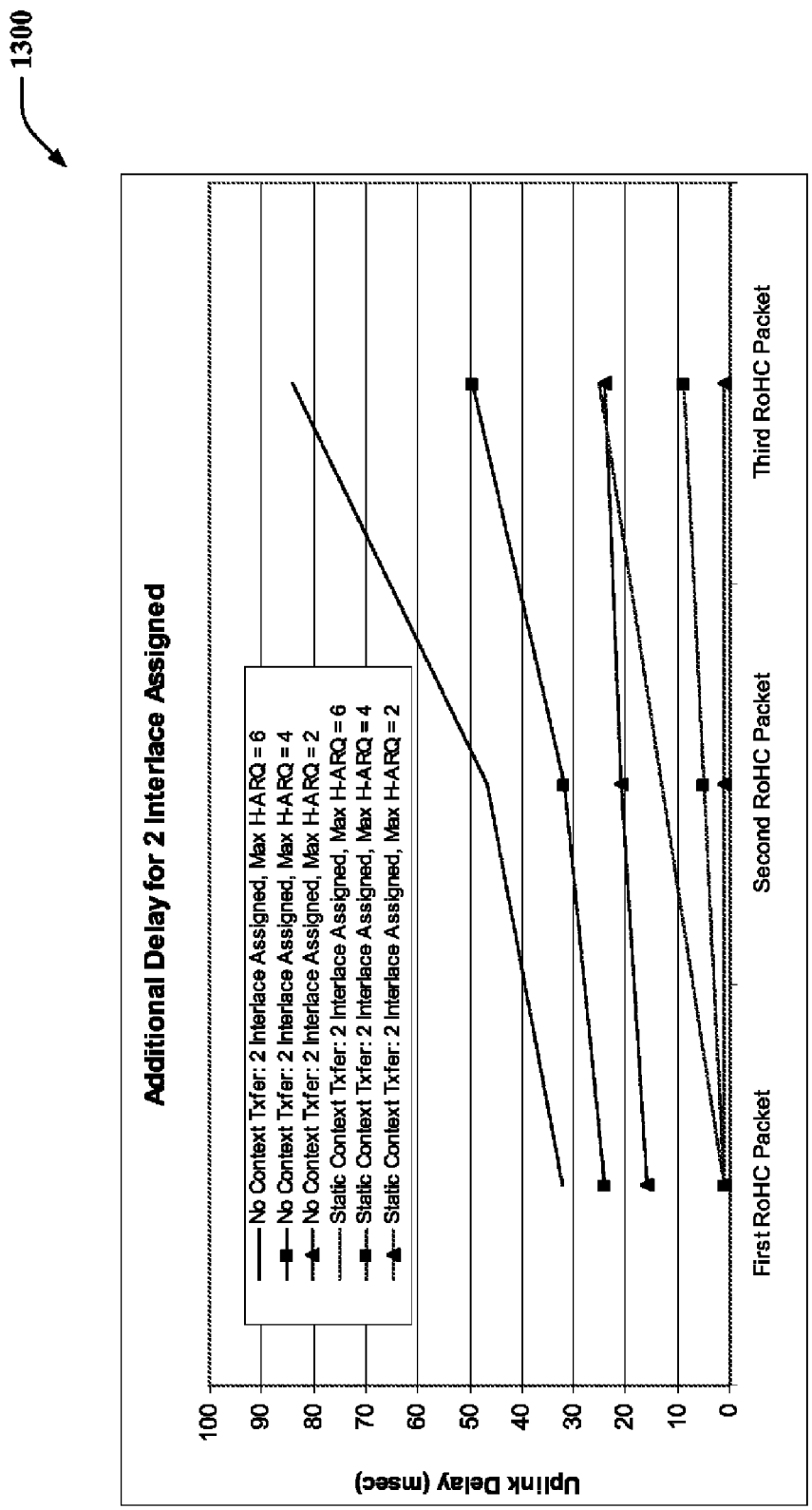
FIG. 13 depicts an example graph 1300 of additional VoIP latency compared to RoHC at aGW with 2 interlaces assigned in regard to RTP profile.

FIG. 13 depicts an example graph 1300 of additional VoIP latency compared to RoHC at aGW with 2 interlaces assigned in regard to RTP profile. Graph 1300 depicts example latencies for various instances where there is no compression context transfer at handover and various instances where there is compression context transfer at handover (e.g., source base station transfers compression static context to the target base station at handover).

In an aspect, with regard to RoHC RTP profile, when there is compression static and semi-static context transferred by the source base station 202 to the target base station 206 during inter-base station handover of the mobile device 116 to the target base station 206, a downlink compressor (e.g., compressor 406 of target base station 206) can apply the following fields to its compression static context and semi-static context. For example, the fields for an IPv6 header can include Version, Flow Label, Next Header, Source Address, Destination Address, Traffic Class, and Hop Limit; the fields for a UDP header can include Source Port and Destination Port; and the fields for the RTP header can include Version, Extension, SSRC, and Payload Type. The downlink compressor can assume that the above compression context (e.g., compression static context and semi-static context) is already set up at the downlink decompressor (e.g., decompressor component of the compressor 308 of the mobile device 116), and based in part on that, the downlink compressor can begin with sending an IR-DYN packet, which can have a size of approximately 24 octets, instead of sending an IR packet, which can have a size of approximately 60 octets.

Further, the uplink decompressor (e.g., decompressor component of the compressor 406 of the target base station 206) can apply the following fields to its static context and semi-static context. For example, the fields for an IPv6 header can include Version, Flow Label, Next Header, Source Address, Destination address, Traffic Class, and Hop Limit; the fields for a UDP header can include Source Port, and Destination Port; and the fields for the RTP header can include Version, Extension, SSRC, and Payload Type.

In another aspect, with regard to the RoHC UDP profile, there can be 2 or 3 IR packets employed, as desired, during establishment of RoHC context between a mobile device and a base station (e.g., target base station). For instance, an IR packet for IPv4 typically can contain 28 bytes of data, and an IR packet for IPv6 typically can contain 48 bytes of data. The total size of data for the RoHC RTP profile can be (IR packet size×the number of IR data packets). Depicted in Table 6 are some example RoHC context sizes for RoHC UDP profile.

TABLE 6

| IP | Number of IR packets | RoHC context (bytes) |
|---|---|---|
| v4 | 2 | 56 |
| v4 | 3 | 84 |
| v6 | 2 | 96 |
| v6 | 3 | 144 | where num_IR refers to the number of IR data packets employed.

When employing IPv6, if there is no compression static context transfer from the source base station to the target base station during inter-base station handover of a mobile device, IR data packets are sent, where an IR packet can include 1 byte for packet type, 1 byte for profile, 1 byte for CRC, 39 bytes for IPv6, and 6 bytes for UDP, for a total of 48 bytes. If compression static context is transferred from the source base station 202 to the target base station 206 during inter-base station handover of a mobile device 116, smaller compressed packets (e.g., UO-0 or UOR-2) can be used, where UO-0 can include compressed packet of 1 byte and UDP checksum of 2 bytes for a total size of 3 bytes; and UOR-2 can include a compressed packet of 2 bytes and UDP checksum having 2 bytes for a total size of 4 bytes. Thus, a compressed packet having a size of 3 or 4 bytes can be employed when compression static context transfer is performed by the source base station 202 to transfer compression static context to the target base station 206 during handover, as compared to a data packet of 48 bytes when there is no compression context transfer by the source base station to the target base station during handover.

An example of the average RoHC bytes per handoff for gaming traffic is illustrated in Table 7:

TABLE 7

|  | No context transfer (bytes) | Static context transfer (bytes) |
| --- | --- | --- |
| IPv6, num_IR = 2 | 96 | 6 |
| IPv6, num_IR = 3 | 144 | 9 |

An example of the percentage of additional overhead due to RoHC for gaming traffic is illustrated in Table 8:

TABLE 8

|  | No context transfer (%) | Static context transfer (%) |
| --- | --- | --- |
| IPv6, num_IR = 2 Inter-handoff interval = 5 sec | 2.33 | 0.19 |
| IPv6, num_IR = 3 Inter-handoff interval = 5 sec | 3.50 | 0.29 |
| IPv6, num_IR = 2 Inter-handoff interval = 2 sec | 5.83 | 0.49 |
| IPv6, num_IR = 3 Inter-handoff interval = 2 sec | 8.74 | 0.73 |
| IPv6, num_IR = 2 Inter-handoff interval = 1 sec | 11.66 | 0.97 |
| IPv6, num_IR = 3 Inter-handoff interval = 1 sec | 17.49 | 1.46 | where num_IR refers to the number of IR data packets employed.

In an aspect, when there is compression static and semi-static context transferred by the source base station 202 to the target base station 206 during inter-base station handover of the mobile device 116 to the target base station 206, a downlink compressor (e.g., compressor 406 of target base station 206) can apply the following fields to its compression static context and semi-static context. For example, the fields for an IPv6 header can include Version, Flow Label, Next Header, Source Address, Destination address, Traffic Class, and Hop Limit; and the fields for a UDP header can include Source Port and Destination Port. The downlink compressor can assume that the above compression context (e.g., compression static context and semi-static context) is already set up at the downlink decompressor (e.g., decompressor component of the compressor 308 of the mobile device 116), and based in part on that, the downlink compressor can begin with sending the UO-0 data packet, which can be 3 octets including UDP checksum, or UOR-2 data packet, which can be 4 octets including UDP checksum, instead of sending the IR packet, which can have a size of approximately 48 octets.

Further, the uplink decompressor (e.g., decompressor component of the compressor 406 of the target base station) can apply the following fields to its compression static context and semi-static context. For example, the fields for an IPv6 header can include Version, Flow Label, Next Header, Source Address, Destination Address, Traffic Class, and Hop Limit; and the fields for a UDP header can include Source Port and Destination Port.

Figure 14:
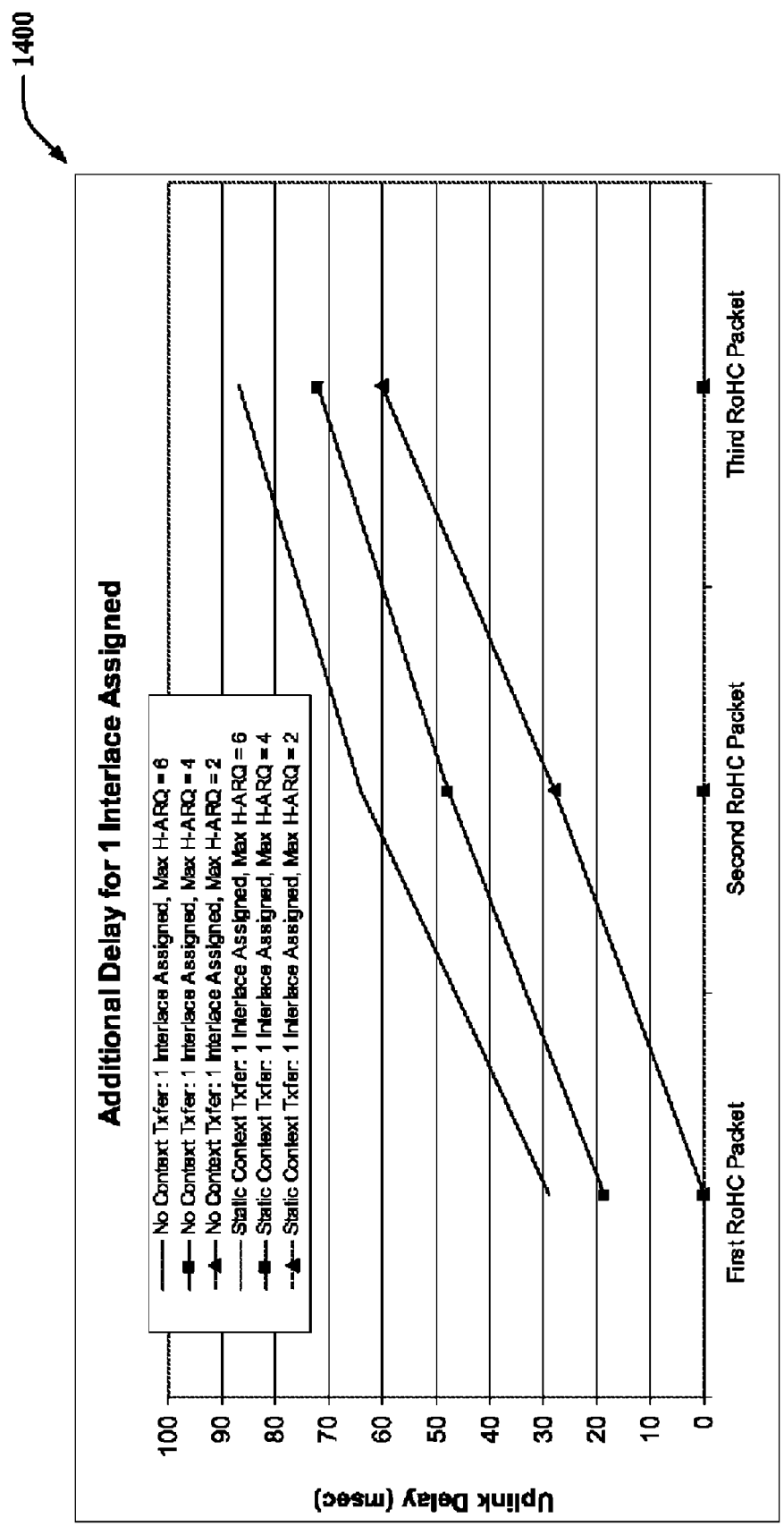
FIG. 14 illustrates an example graph 1400 of additional gaming latency compared to RoHC at aGW with 1 interlace assigned in regard to UDP profile.

Referring to FIG. 14, illustrated is an example graph 1400 of additional gaming latency compared to RoHC at aGW with 1 interlace assigned in regard to UDP profile. Graph 1400 depicts example latencies for various instances where there is no compression context transfer at handover and various instances where there is compression context transfer at handover (e.g., source base station transfers compression static context to the target base station at handover).

Figure 15:
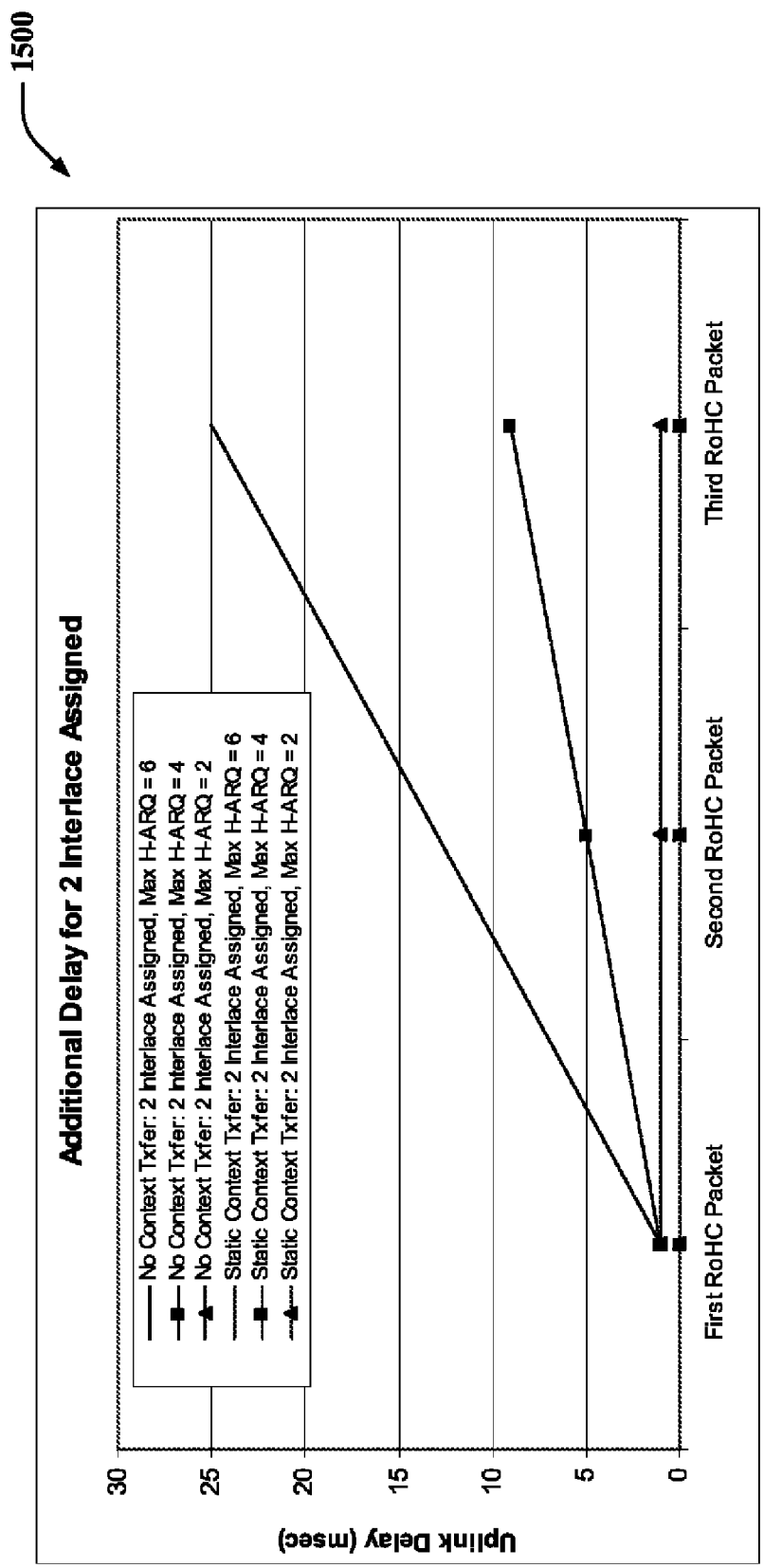
FIG. 15 illustrates an example graph 1500 of additional gaming latency compared to RoHC at aGW with 2 interlaces assigned in regard to UDP profile.

Turning to FIG. 15, illustrated is an example graph 1500 of additional gaming latency compared to RoHC at aGW with 2 interlaces assigned in regard to UDP profile. Graph 1500 depicts example latencies for various instances where there is no compression context transfer at handover and various instances where there is compression context transfer at handover (e.g., source base station transfers compression static context to the target base station at handover).

Figure 16:
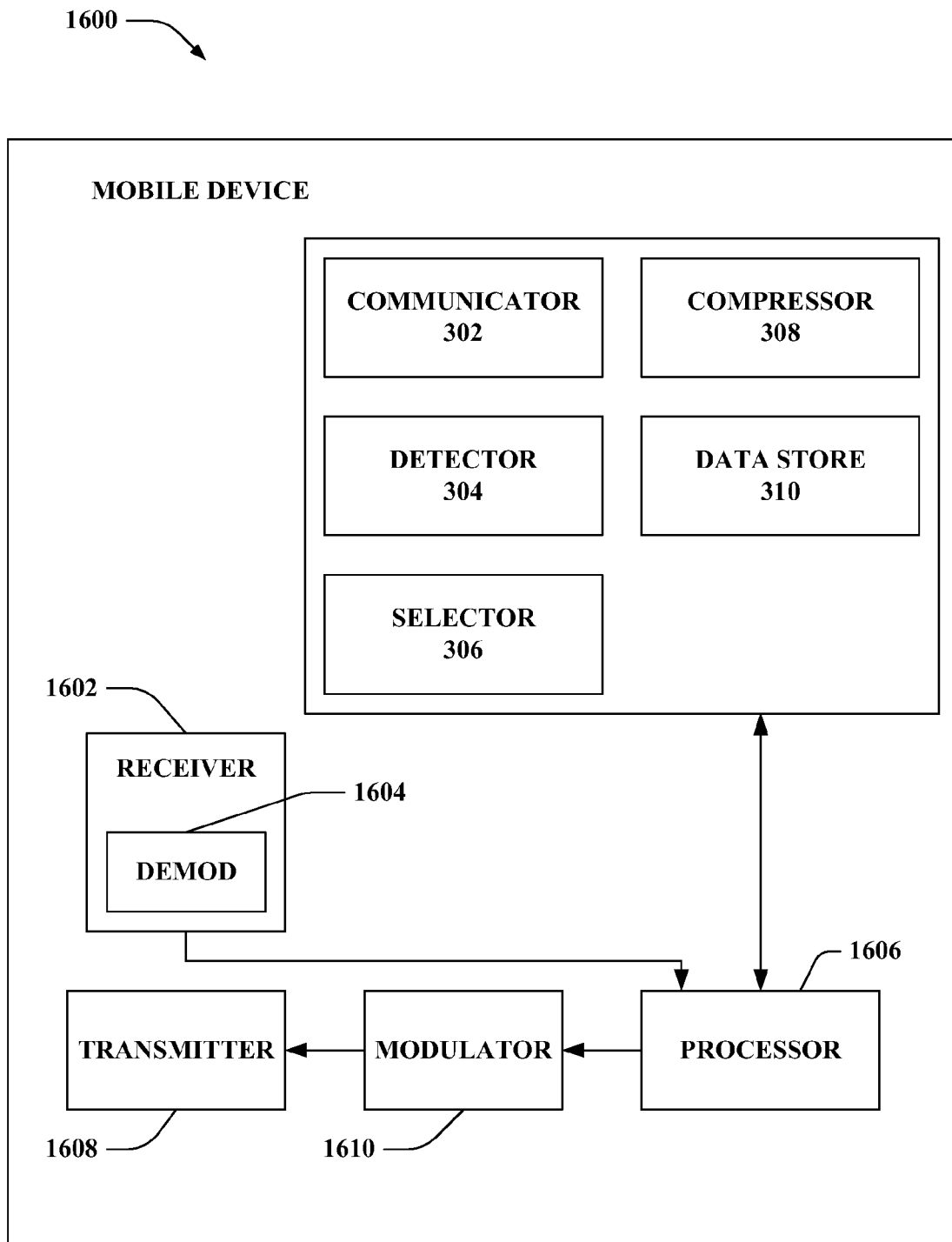
FIG. 16 is an illustration of an example mobile device that can facilitate communications associated with a mobile device in a wireless communication system in accordance with an aspect of the disclosed subject matter.

FIG. 16 is an illustration of a mobile device 1600 that can facilitate communications associated with a mobile device in a wireless communication system in accordance with an aspect of the disclosed subject matter. It is to be appreciated that the mobile device 1600 can be the same or similar as, and/or can comprise the same or similar functionality as, mobile device 116, such as more described herein, for example, with regard to system 100, system 200, system 300, system 400, methodology 500, methodology 600, and methodology 700.

Mobile device 1600 can comprise a receiver 1602 that receives a signal from, for instance, a receive antenna (not shown), and performs typical actions thereon (e.g., filters, amplifies, downconverts, etc.) the received signal and digitizes the conditioned signal to obtain samples. Receiver 1602 can be, for example, an MMSE receiver, and can comprise a demodulator 1604 that can demodulate received symbols and provide them to a processor 1606 for channel estimation. Processor 1606 can be a processor dedicated to analyzing information received by receiver 1602 and/or generating information for transmission by a transmitter 1608, a processor that controls one or more components of mobile device 1600, and/or a processor that both analyzes information received by receiver 1602, generates information for transmission by transmitter 1608, and controls one or more components of mobile device 1600. Mobile device 1600 can also comprise a modulator 1610 that can work in conjunction with the transmitter 1608 to facilitate transmitting signals (e.g., data) to, for instance, a base station (e.g., 102, 202, 206), another mobile device (e.g., 122), etc.

In one aspect, the processor 1606 can be connected to a communicator 302 that can facilitate transmitting information, such as data, compression context, etc., to another base station (e.g., source base station, target base station), another mobile device, or another device in a wireless communication environment. In another aspect, the processor 1606 can be connected with a detector 304 that can facilitate detecting a cell(s) located in the vicinity of the mobile device 1600. The processor 1606 also can be connected to a selector 306 that can facilitate selecting or switching to a desired cell (e.g., target cell 208) of a desired base station (e.g., target base station 206) with which communication by the mobile device 116 can be facilitated based at least in part on a message received from a cell (e.g., source cell 204) of a serving base station (e.g., source base station 202) indicating the selection or switching of the mobile device 116 to the desired cell. The processor 1606 can be connected to a compressor 308 that can facilitate compressing data to be transmitted to a base station, a mobile device, or another device and/or can facilitate decompressing compressed data received from a base station, a mobile device, or another device, in accordance with a compression context.

Mobile device 1600 can additionally comprise data store 310 that can be operatively coupled to processor 1606 and can store data to be transmitted, received data, information related to base stations and/or cells (e.g., source base station 202, target base station 206), information related to the mobile device 1600, and/or any other suitable information that can facilitate communication of data associated with the mobile device 1600. Data store 310 can additionally store protocols and/or algorithms associated with evaluating received indicator information related to compression context transfer by a source base station 202, determining remaining compression context to be established after handover of the mobile device to a target base station, establishing compression context with a base station (e.g., target base station 206), compressing data to be transmitted or decompressing received compressed data, and/or other functions related to the mobile device 1600.

It is to be appreciated and understood that the communicator 302, detector 304, selector 306, compressor 308, and data store 310 each can be the same or similar as, or can comprise the same or similar functionality as, respective components such as more fully described herein, for example, with regard to system 300. It is to be further appreciated and understood that the communicator 302, detector 304, selector 306, compressor 308, and data store 310 each can be a stand-alone unit (as depicted), can be included within the processor 1606, can be incorporated within another component, and/or virtually any suitable combination thereof, as desired.

Figure 17:
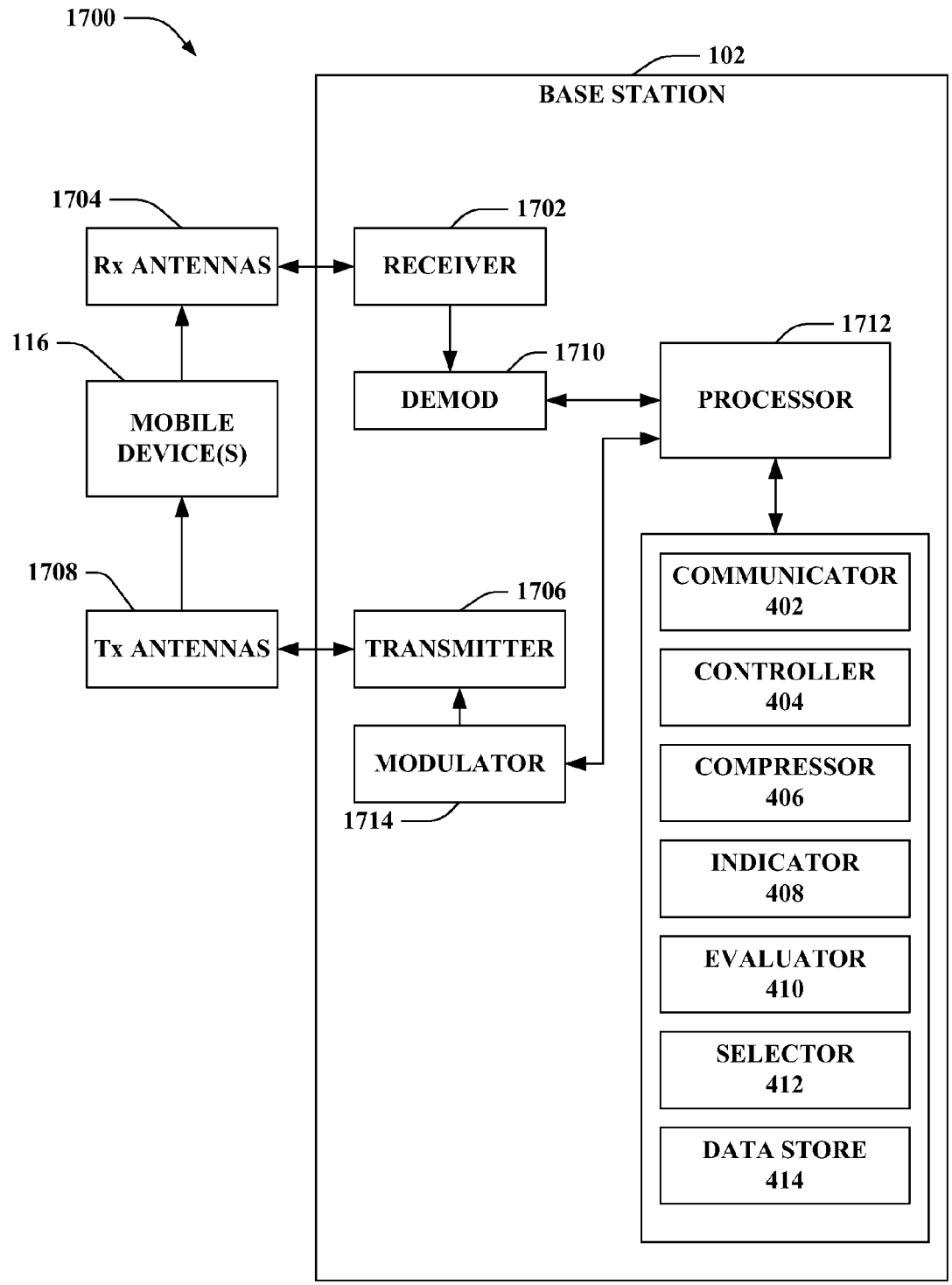
FIG. 17 is a depiction of an example system that can facilitate communications associated with a mobile device in a wireless communication system in accordance with an aspect of the disclosed subject matter.

FIG. 17 is an illustration of a system 1700 that can facilitate communications associated with a mobile device in a wireless communication system in accordance with an aspect of the disclosed subject matter. System 1700 can comprise a base station 102 (e.g., access point, . . . ). The base station 102 can include a receiver 1702 that can receive signal(s) from one or more mobile devices 116 through a plurality of receive antennas 1704, and a transmitter 1706 that can transmit signals (e.g., data) to the one or more mobile devices 116 through a transmit antenna 1708. Receiver 1702 can receive information from receive antennas 1704 and can be operatively associated with a demodulator 1710 that can demodulate received information. Demodulated symbols can be analyzed by a processor 1712 that can be a processor dedicated to analyzing information received by receiver 1702 and/or generating information for transmission by a transmitter 1706, a processor that controls one or more components of base station 102, and/or a processor that both analyzes information received by receiver 1702, generates information for transmission by transmitter 1706, and controls one or more components of base station 102. The base station 102 can also comprise a modulator 1714 that can work in conjunction with the transmitter 1706 to facilitate transmitting signals (e.g., data) to, for instance, a mobile device 116, another device, etc.

Processor 1712 can be connected with a communicator 402 that can facilitate transmitting information from the base station 102 to a mobile device 116, another base station(s) (e.g., target base station 206), a cell (e.g., target cell 208), and/or another device(s) associated with the base station 102 in a wireless communication environment. Processor 1712 also can be connected to a controller 404 that can comprise one or more processors, microprocessors, and/or controllers that can facilitate analyzing information and/or generating information for transmission, and/or can control one or more components of the source base station 202.

In another aspect, processor 1712 can be connected with a compressor 406 that can compress data to be transmitted to a base station (e.g., target base station 206), a mobile device 116, and/or another device and/or can facilitate decompressing compressed data received from another base station, a mobile device 116, or another device, in accordance with a compression context. In still another aspect, processor 1712 can be connected with an indicator 408 that can facilitate providing indicator information, such as context indicator and/or handover indicator (e.g., base station identifier), to a mobile device 116 during a handover of the mobile device 116 to a disparate cell (e.g., target cell 208).

Processor 1712 can be connected with an evaluator 410 that can facilitate evaluating information (e.g., compression context information, signal strengths of cells, etc.) related to a mobile device 116, the base station 102, other base stations, and/or cells (e.g., target cell 208) to facilitate establishing compression context between the source base station 202 and the mobile device 116 and/or to facilitate selecting a cell with which a mobile device 116 can communicate to facilitate communication by the mobile device 116 in the network. Processor 1712 also can be connected to a selector 412 that can utilize the evaluation results related to cell selection to facilitate selecting a cell (e.g., target cell 208) with which a mobile device 116 can communicate.

Processor 1712 can be coupled to a data store 414 that can store information related to data to be transmitted, received data, information related to base stations (e.g., base station 102, target base station 206), information related to a mobile device 116, information related to cells (e.g., source cell 202, target cell 206), and any other suitable information that can facilitate communication of information (e.g., voice, data) associated with a mobile device 116. Data store 414 can additionally store protocols and/or algorithms associated with and facilitating communicating with a mobile device 116, another base station, cells, or another device; transferring compression context information to a target base station; evaluating information (e.g., compression context) associated with a mobile device 116, the base station 102, another base station 102, or cell (e.g., 208); and/or establishing compression context between a mobile device and a base station (e.g., target base station 206).

It is to be appreciated and understood that the communicator 402, controller 404, compressor 406, indicator 408, evaluator 410, selector 412, and data store 414 each can be the same or similar as, and/or can comprise the same or similar functionality as, respective components, such as more fully described herein, for example, with regard to system 400. It is to be further appreciated and understood that communicator 402, controller 404, compressor 406, indicator 408, evaluator 410, selector 412, and data store 414, each can be a stand-alone unit (as depicted), can be included within the processor 1712, can be incorporated within another component, and/or virtually any suitable combination thereof, as desired.

Figure 18:
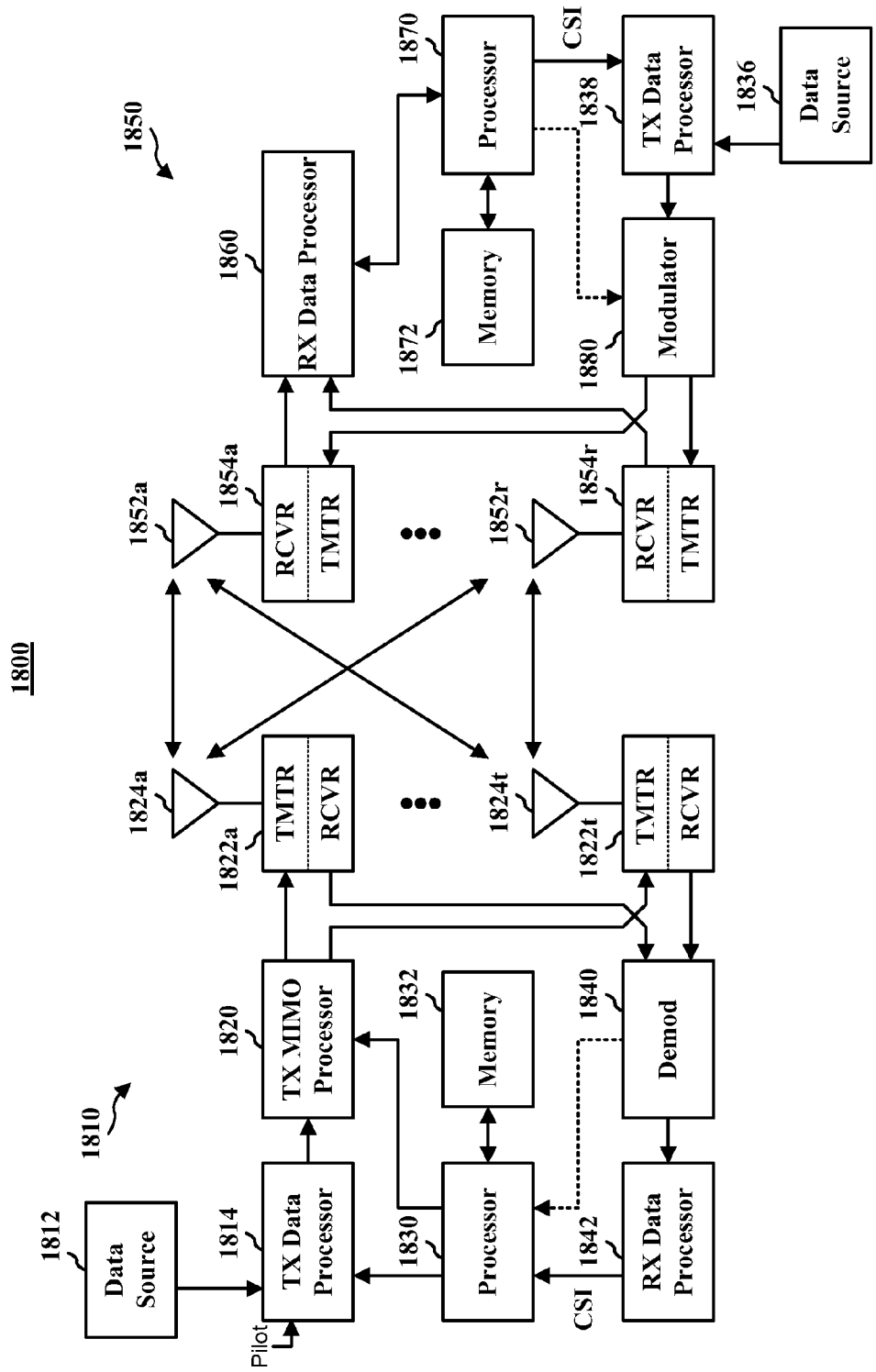
FIG. 18 is an illustration of an example wireless network system that can be employed in conjunction with the various systems and methods described herein.

FIG. 18 shows an example wireless communication system 1800 in accordance with an aspect of the disclosed subject matter. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-4, 16-17) and/or methods (FIGS. 5-7) described herein to facilitate wireless communication there between. It is to be appreciated that base station 1810 and mobile device 1850 each can be respectively the same or similar as, and/or can comprise respectively the same or similar functionality as, respective components as more fully described herein, such as, for example, with regard to system 100, system 200, system 300, system 400, methodology 500, methodology 600, methodology 700, system 1600, and/or system 1700.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At mobile device 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

A processor 1870 can periodically determine which precoding matrix to use (discussed below). Further, processor 1870 can formulate a reverse link message comprising a matrix index portion and a rank value portion.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message and can determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 19:
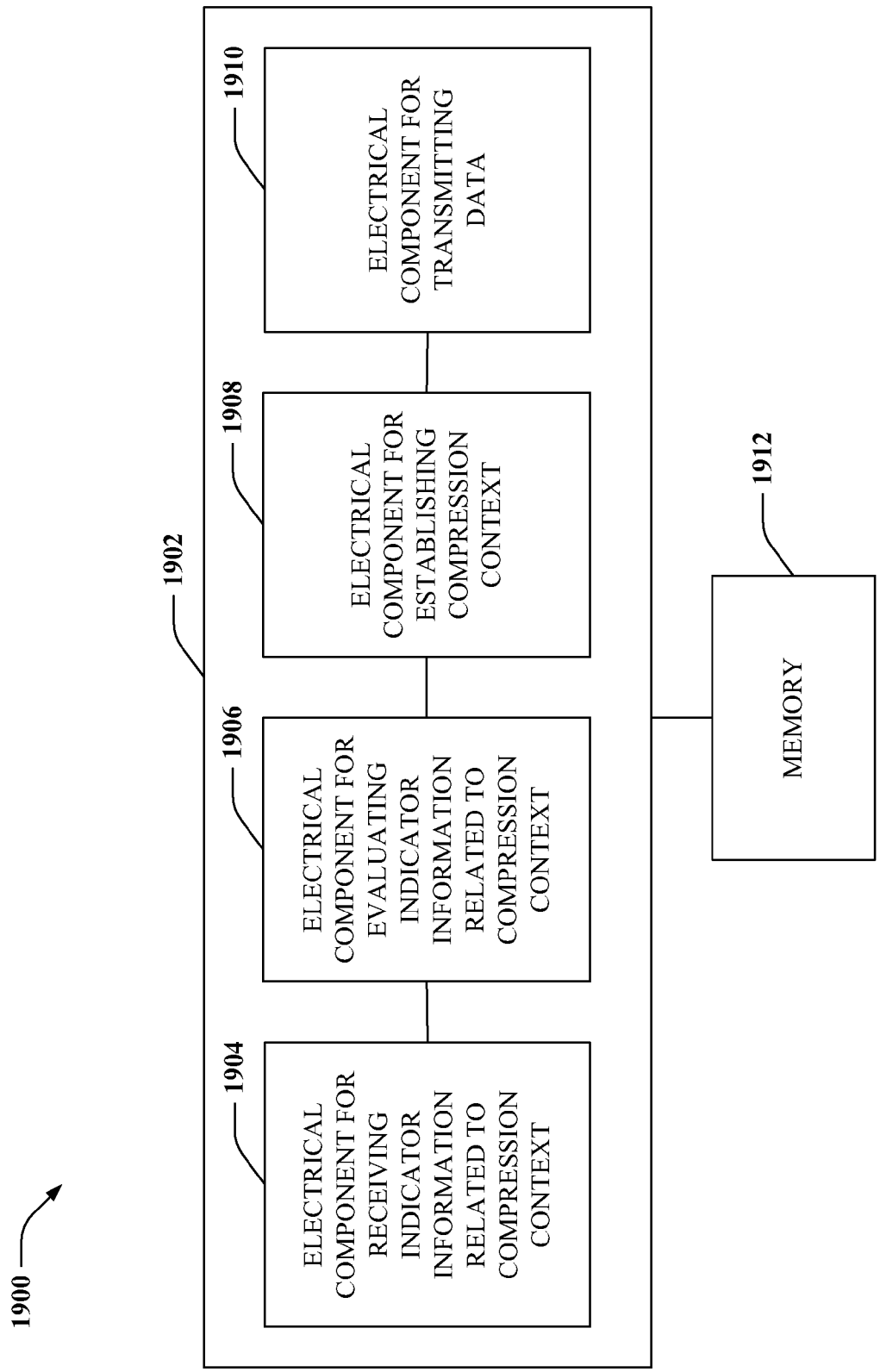
FIG. 19 is a depiction of an example system that can facilitate communication associated with a mobile device in a wireless communication environment.

With reference to FIG. 19, illustrated is a system 1900 that can facilitate communication associated with a mobile device in a wireless communication environment. For example, system 1900 can reside at least partially within a mobile device (e.g., 116). It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction.

For instance, logical grouping 1902 can include an electrical component for receiving indicator information related to compression context 1904. In one aspect, the electrical component for receiving indicator information related to compression context 1904 can receive indicator information, such as a context indicator and/or handover indicator, that can indicate whether a handover from a source base station 202 to target base station 206 is an inter-base station handover or intra-base station handover, whether compression context was transferred by a source base station 202 to a target base station 206, and/or what portion of compression context was transferred by a source base station 202 to a target base station 206 prior to or during handover.

Further, logical grouping 1902 can comprise an electrical component for evaluating indicator information related to compression context 1906. In one aspect, the electrical component for evaluating indicator information related to compression context 1906 can analyze and evaluate received indicator information to facilitate determining whether compression context was transferred from a source base station 202 to a target base station 206, what portion of compression context was transferred from a source base station 202 to a target base station 206, what portion of compression context remains to be established between a mobile device 116 and target base station 206 after handover from a source base station 202, whether a handover is an intra-base station handover or inter-base station handover, etc.

Logical grouping 1902 also can include an electrical component for establishing compression context with a base station (e.g., target base station 206) 1908. In one aspect, the electrical component for establishing compression context with a base station 1908 can facilitate establishing compression context (e.g., compression static, semi-static and/or dynamic context) between a mobile device (e.g., 116) and a base station (e.g., target base station 206). For instance, electrical component for establishing compression context with a base station 1908 can facilitate establishing any portion of compression context (e.g., dynamic context) that remains to be established between the mobile device 116 and target base station 206 after handover, where the source base station 202 transfers a subset of compression context (e.g., static and semi-static context) to the target base station 206 prior to or during handover of the mobile device 116 to the target base station 206.

Logical grouping 1902 also can include an electrical component for transmitting data 1910. In one aspect, the electrical component for transmitting data 1910 can facilitate transmitting data, including compressed data, between a mobile device 116 and a base station (e.g., source base station 202, target base station 206) and/or another device associated with the mobile device 116. Additionally, system 1900 can include a memory 1912 that can retain instructions for executing functions associated with electrical components 1904, 1906, 1908, and 1910. While shown as being external to memory 1912, it is to be understood that one or more of electrical components 1904, 1906, 1908, and 1910 can exist within memory 1912.

Figure 20:
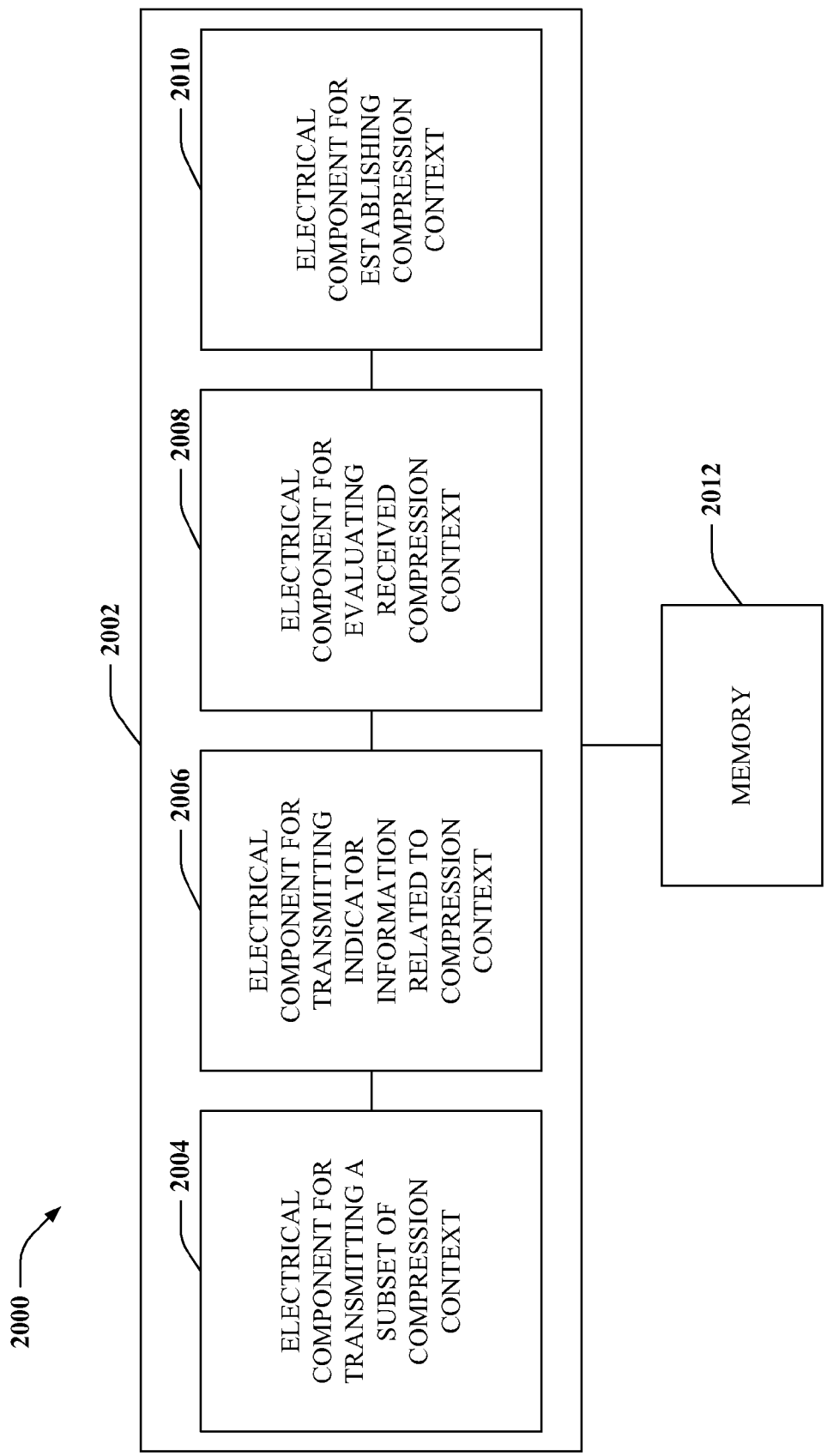
FIG. 20 is an illustration of another example system that can facilitate communication associated with a mobile device in a wireless communication environment.

Turning to FIG. 20, illustrated is a system 2000 that can facilitate communication associated with a mobile device in a wireless communication environment. For example, system 2000 can reside at least partially within a base station 102 (e.g., base station 102, source base station 202, target base station 206) that can be associated (e.g., wirelessly connected) with a mobile device (e.g., 116). It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction.

In one aspect, logical grouping 2002 can include an electrical component for transmitting a subset of compression context 2004. In one aspect, the electrical component for transmitting a subset of compression context 2004 can transmit a subset of compression context (e.g., compression static and semi-static context) from a source base station 202 to a target base station 206 during a handover (e.g., inter-base station handover) of a mobile device 116 from the source base station 202 to the target base station 206 to facilitate establishing at least a portion of the compression context between the mobile device 116 and the target base station 206 prior to or during handover in order to facilitate efficiently establishing compression context between the mobile device 116 and target base station 206.

Further, logical grouping 2002 can comprise an electrical component for transmitting indicator information related to compression context 2006. In one aspect, the electrical component for transmitting indicator information related to compression context 2006 can transmit indicator information related to compression context to a mobile device 116 that is being handed over from a source cell 204 to a target cell 208 so that the mobile device 116 can determine whether any compression context was transferred from the source base station 202 to the target base station 206, and if so, what portion of the compression context was transferred from the source base station 202 to the target base station 206, during a handover of the mobile device 116 to the target cell 208, in order to facilitate determining what portion of the compression context remains to be established between the mobile device 116 and target cell 208 (e.g., and associated target base station 206) after handover. The indicator information also can specify whether a handover is an inter-base station handover or an intra-base station handover.

Logical grouping 2002 also can include an electrical component for evaluating received compression context 2008. In one aspect, the electrical component for evaluating received compression context 2008 can analyze and evaluate received compression context and can apply received compression context. For instance, a subset of compression context comprising static and semi-static context can be received by a target base station 206 from a source base station 202 during an inter-base station handover of the mobile device 116 to the target base station 206. The target base station 206 can apply the received subset of compression context to establish at least the static and semi-static context between the target base station 206 and mobile device 116 to facilitate efficient communication between the target base station 206 and the mobile device 116. Upon establishing at least a portion of the compression context, such as establishing compression static and semi-static context, data packets (or at least certain data packets) can be compressed and transmitted in compressed form between the target base station 206 and the mobile device 116 to facilitate establishing any remaining compression context (e.g., compression dynamic context) to be established and/or communicating any other desired data.

Logical grouping 2002 also can include an electrical component for establishing compression context 2010. In an aspect, the electrical component for establishing compression context 2010 can establish compression context between the mobile device 116 and a base station (e.g., target base station 206). The electrical component for establishing compression context 2010 can establish the compression context using a subset of compression context (e.g., compression static and semi-static context) that can be received from a source base station 202 and/or another subset of compression context (e.g., compression dynamic context) communicated between the mobile device 116 and target base station 206. Additionally, system 2000 can include a memory 2012 that retains instructions for executing functions associated with electrical components 2004, 2006, 2008, and 2010. While shown as being external to memory 2012, it is to be understood that one or more of electrical components 2004, 2006, 2008, and 2010 can exist within memory 2012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication associated with a mobile device, comprising:
receiving at least one indicator that indicates what portion of compression context is transferred from a source base station to a target base station to facilitate establishing full compression context between the mobile device and the target base station during a handover of the mobile device from the source base station to the target base station; and
communicating with the target base station to establish any remaining portion of compression context that remains to be established after handover of the mobile device to the target base station, the remaining portion of compression context to be established is determined based at least in part on the at least one indicator.

2. The method of claim 1, the at least one indicator indicates that the portion of compression context that is transferred is at least one of no compression context is transferred, at least a portion of compression context is transferred, or full compression context is transferred.

3. The method of claim 1, the at least one indicator indicates that the portion of compression context that is transferred is at least a portion of compression context, the at least a portion of compression context comprising at least one of compression static context or compression semi-static context, and further indicates that the handover is an inter-base station handover.

4. The method of claim 3, the at least a portion of compression context comprising at least one of Robust Header Compression (RoHC) static context or RoHC compression semi-static context.

5. The method of claim 1, the remaining portion of compression context comprising compression dynamic context.

6. The method of claim 1, further comprising:
receiving at least one message, the at least one message comprising the at least one indicator, wherein the at least one message is at least one of a handover message or a disparate message;
evaluating the at least one indicator to determine type of handover and the portion of compression context transferred from the source base station to the target base station;
switching over from a source cell of the source base station to a target cell of the target base station at a predetermined time based at least in part on the at least one message; and
after switching over the mobile device to the target cell, receiving at least one data packet from the target base station to facilitate establishing the remaining compression context to be established, the at least one data packet comprising data that is compressed based at least in part on the at least a portion of the compression context established between the mobile device and the target base station.

7. The method of claim 6, further comprising:
decompressing the at least one data packet based at least in part on the portion of compression context established between the mobile device and the target base station.

8. The method of claim 1, the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

9. The method of claim 1, the full compression context facilitates at least one of data communication, voice communication, Voice Over Internet Protocol (VoIP), or data traffic related to gaming.

10. A wireless communications apparatus, comprising:
a memory that retains instructions related to reception of at least one indicator that indicates what subset of compression context is transferred from a source base station to a target base station during handover of a mobile device from the source base station to the target base station, the mobile device facilitates establishing a remaining subset of compression context to be established between the mobile device and the target base station based at least in part on the indicator; and
a processor, coupled to the memory, configured to execute the instructions retained in the memory.

11. The wireless communications apparatus of claim 10, the at least one indicator indicates the subset of compression context transferred comprises at least one of no compression context is transferred, static compression context is transferred, static and semi-static compression context is transferred, or full compression context is transferred.

12. The wireless communications apparatus of claim 10, wherein the memory retains instructions related to:
reception of at least one message, the at least one message comprising the at least one indicator, wherein the at least one message is at least one of a handover message or a disparate message;
handover of the mobile device from a source cell of the source base station to a target cell of the target base station at a predetermined time based at least in part on the at least one message, the handover is an inter-base-station handover of the mobile device from a source cell of the source base station to a target cell of the target base station, wherein the at least one indicator specifies that the handover is an inter-base-station handover; and
after handover of the mobile device to the target cell, reception of at least one data packet from the target base station to facilitate establishing the remaining compression context to be established, the at least one data packet comprising data that is compressed based at least in part on the at least a portion of the compression context established between the mobile device and the target base station.

13. The wireless communications apparatus of claim 12, wherein the memory further retains instructions related to decompression of at least one received data packet, comprising data compressed based at least in part on the subset of compression context that is transferred, to facilitate establishing the remaining subset of compression context to be established.

14. The wireless communications apparatus of claim 10, the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

15. A wireless communications apparatus that facilitates communication associated with a mobile device, comprising:
means for receiving at least one indicator that specifies what portion of compression context is transferred from a source base station to a target base station to facilitate establishing full compression context between the mobile device and the target base station during a handover of the mobile device from the source base station to the target base station; and
means for communicating with the target base station to establish any remaining portion of compression context that remains to be established after handover of the mobile device to the target base station, the remaining portion of compression context to be established is determined based at least in part on the at least one indicator.

16. The wireless communications apparatus of claim 15, the at least one indicator specifies that the portion of compression context that is transferred is at least one of no compression context is transferred, at least a portion of compression context is transferred, or full compression context is transferred.

17. The wireless communications apparatus of claim 15, further comprising:
means for receiving at least one message, the at least one message comprising the at least one indicator, wherein the at least one message is at least one of a handover message or a disparate message;
means for switching over of the mobile device from a source cell of the source base station to a target cell of the target base station at a predetermined time based at least in part on the at least one message, the switching over of the mobile device from the source cell to the target cell is related to an inter-base-station handover, the at least one indicator specifies that the handover is an inter-base-station handover;
means for receiving at least one data packet from the target base station to facilitate establishing the remaining compression context to be established, the at least one data packet comprising data that is compressed based at least in part on the at least a portion of the compression context established between the mobile device and the target base station, wherein the at least one data packet is received after the mobile device is switched over to the target cell, wherein the portion of the compression context established comprising at least one of compression static context or compression semi-static context; and
means for decompressing the at least one data packet based at least in part on the portion of compression context established between the mobile device and the target base station to facilitate establishing the remaining portion of compression context to be established between the mobile device and the target base station.

18. A computer program product, comprising:
a non-transitory computer-readable medium comprising code for:
receiving at least one indicator that indicates what portion of compression context is transferred from a source base station to a target base station to facilitate establishing full compression context between the mobile device and the target base station during a handover of the mobile device from the source base station to the target base station; and communicating with the target base station to establish any remaining portion of compression context that remains to be established after handover of the mobile device to the target base station. the remaining portion of compression context to be established is determined based at least in part on the at least one indicator.

19. The computer program product of claim 18, further comprising:
a non-transitory computer-readable medium comprising code for:
receiving at least one message, the at least one message comprising the at least one indicator, wherein the at least one message is at least one of a handover command or a disparate message;
handing over the mobile device from a source cell of the source base station to a target cell of the target base station at a predetermined time based at least in part on the handover command, the handing over of the mobile device from the source cell to the target cell is related to an inter-base-station handover, the at least one indicator specifies that the handover is an inter-base-station handover;
receiving at least one data packet from the target base station to facilitate establishing the remaining compression context to be established, the at least one data packet comprising data that is compressed based at least in part on the at least a portion of the compression context established between the mobile device and the target base station, wherein the at least one data packet is received after the mobile device is handed over to the target cell, wherein the portion of the compression context established comprising at least one of compression static context or compression semi-static context; and
decompressing the at least one data packet based at least in part on the portion of compression context established between the mobile device and the target base station to facilitate establishing the remaining portion of compression context to be established between the mobile device and the target base station.

20. The computer program product of claim 18, the at least one indicator indicates that the portion of compression context that is transferred is at least one of no compression context is transferred, at least a portion of compression context is transferred, or full compression context is transferred, wherein the at least a portion of compression context comprising at least one of compression static context or compression semi-static context.

21. The computer program product of claim 18, the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

22. In a wireless communications system, an apparatus comprising:
a processor configured to:
receive at least one indicator that specifies what portion of compression context is transferred from a source base station to a target base station to facilitate establishing full compression context between the mobile device and the target base station during a handover of the mobile device from the source base station to the target base station; and
communicate with the target base station to establish any remaining portion of compression context that remains to be established after handover of the mobile device to the target base station, the remaining portion of compression context to be established is determined based at least in part on the at least one indicator.

23. The apparatus of claim 22, the processor further configured to:
evaluate the at least one indicator to determine type of handover and the portion of compression context transferred from the source base station to the target base station during handover of the mobile device; and
decompress the at least one received data packet based at least in part on the portion of compression context established between the mobile device and the target base station to facilitate establishing the remaining portion of compression context to be established between the mobile device and the target base station.

24. A method that facilitates communication associated with a mobile device, comprising:
transmitting a subset of compression context from a source base station to a target base station to facilitate establishing at least the subset of compression context prior to or during handover of the mobile device from the source base station to the target base station; and
transmitting at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

25. The method of claim 24, the subset of compression context comprising at least one of compression static context or compression semi-static context, and the at least one indicator specifies that the handover is an inter-base-station handover and further specifies that the subset of compression context comprises at least one of compression static context or compression semi-static context.

26. The method of claim 25, the subset of compression context comprising at least one of Robust Header Compression (RoHC) static context or RoHC compression semi-static context.

27. The method of claim 24, further comprising:
transmitting at least one message comprising the at least one indicator, the at least one message is at least one of a handover message or a disparate message.

28. The method of claim 24, the transmitting the subset of compression context from the source base station to the target base station facilitates establishing full compression context between the mobile device and the target base station after handover of the mobile device to the target base station, wherein the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

29. A wireless communications apparatus, comprising:
a memory that retains instructions related to:
transmission of a subset of compression context from a source base station to a target base station to facilitate establishing at least the subset of compression context prior to or during inter-base-station handover of the mobile device from the source base station to the target base station, and
transmission of at least one message comprising at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator; and
a processor, coupled to the memory, configured to execute the instructions retained in the memory.

30. The wireless communications apparatus of claim 29, the subset of compression context comprising at least one of compression static context or compression semi-static context, and the at least one indicator specifies the handover is an inter-base-station handover and further specifies the subset of compression context comprises at least one of compression static context or compression semi-static context.

31. The wireless communications apparatus of claim 29, the transmission of the subset of compression context from the source base station to the target base station facilitates establishing full compression context between the mobile device and the target base station after handover of the mobile device to the target base station, wherein the full compression context comprises compression static context, compression semi-static context, and compression dynamic context, the full compression context further comprises at least one of Internet Protocol (IP) header, Uniform Datagram Protocol (UDP) header, or Real-Time Transfer Protocol (RTP) header.

32. A wireless communications apparatus that facilitates communication associated with a mobile device, comprising:
means for transmitting a subset of compression context from a source base station to a target base station to facilitate establishing at least the subset of compression context prior to or during handover of the mobile device from the source base station to the target base station; and
means for transmitting at least one message comprising at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

33. The wireless communications apparatus of claim 32, the subset of compression context comprising at least one of compression static context or compression semi-static context, and the at least one indicator specifies the handover is an inter-base-station handover and further specifies that the subset of compression context comprises at least one of compression static context or compression semi-static context.

34. The wireless communications apparatus of claim 32, the means for transmitting the subset of compression context from the source base station to the target base station facilitates establishing full compression context between the mobile device and the target base station after handover of the mobile device to the target base station, wherein the full compression context comprises compression static context, compression semi-static context, and compression dynamic context, the full compression context further comprises at least one of Internet Protocol (IP) header, Uniform Datagram Protocol (UDP) header, or Real-Time Transfer Protocol (RTP) header.

35. A computer program product, comprising:
a non-transitory computer-readable medium comprising code for:
transferring a subset of compression context from a source base station to a target base station to facilitate establishing at least the subset of compression context prior to or during handover of the mobile device from the source base station to the target base station; and
transmitting at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

36. The computer program product of claim 35, further comprising:
a non-transitory computer-readable medium comprising code for:
transmitting at least one message comprising the at least one indicator, the at least one message is at least one of a handover message or a disparate message.

37. The computer program product of claim 35, the subset of compression context comprising at least one of compression static context or compression semi-static context, and the at least one indicator specifies the handover is an inter-base-station handover and further specifies that the subset of compression context comprises at least one of compression static context or compression semi-static context.

38. The computer program product of claim 35, the transferring the subset of compression context from the source base station to the target base station facilitates establishing full compression context between the mobile device and the target base station after handover of the mobile device to the target base station, wherein the full compression context comprises compression static context, compression semi-static context, and compression dynamic context, the full compression context further comprises at least one of Internet Protocol (IP) header, Uniform Datagram Protocol (UDP) header, or Real-Time Transfer Protocol (RTP) header.

39. In a wireless communications system, an apparatus comprising:
a processor configured to:
transfer a subset of compression context from a source base station to a target base station to facilitate establishing at least the subset of compression context prior to or during handover of the mobile device from the source base station to the target base station; and
transmit at least one indicator to the mobile device, the at least one indicator specifies the subset of compression context transmitted to the target base station to enable the mobile device to determine the subset of compression context established by the target base station prior to or during handover of the mobile device to the target base station based at least in part on the at least one indicator.

40. The apparatus of claim 39, the subset of compression context comprising at least one of compression static context or compression semi-static context, wherein establishment of the subset of compression context by the target base station prior to or during handover of the mobile device to the target base station facilitates establishment of full compression context between the mobile device and the target base station after handover, and the at least one indicator specifies the handover is an inter-base-station handover and further specifies that the subset of compression context comprises at least one of compression static context or compression semi-static context.

41. A method that facilitates communication associated with a mobile device, comprising:
  receiving a subset of compression context from a source base station to facilitate establishing at least the subset of compression context prior to or during inter-base-station handover of the mobile device from the source base station to a target base station; and
  applying the subset of compression context to establish at least the subset of compression context prior to or during the inter-base-station handover.

42. The method of claim 41, the subset of compression context comprising at least one of compression static context or compression semi-static context, wherein the applying the subset of compression context facilitates establishing full compression context between the mobile device and the target base station after the inter-base-station handover, wherein the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

43. The method of claim 41, the subset of compression context comprising at least one of Robust Header Compression (RoHC) static context or RoHC compression semi-static context.

44. The method of claim 41, further comprising:
  compressing at least one data packet based at least in part on the subset of compression context established between the mobile device and the target base station to facilitate establishing a remaining subset of compression context to be established between the mobile device and the target base station; and
  transmitting the at least one data packet, comprising compressed data, to the mobile device to facilitate establishing the remaining subset of compression context to establish full compression context between the mobile device and the target base station.

45. The method of claim 44, further comprising:
  applying the remaining subset of compression context to establish full compression context between the mobile device and the target base station, the remaining subset of compression context comprising compressed data that is decompressed based at least in part on the subset of compression context established prior to or during the inter-base-station handover.

46. A wireless communications apparatus, comprising:
  a memory that retains instructions related to:
    reception of a subset of compression context from a source base station to facilitate establishing at least the subset of compression context prior to or during inter-base -station handover of the mobile device from the source base station to a target base station, and
    application of the subset of compression context to establish at least the subset of compression context prior to or during the inter-base-station handover; and
  a processor, coupled to the memory, configured to execute the instructions retained in the memory.

47. The wireless communications apparatus of claim 46, the subset of compression context comprising at least one of compression static context or compression semi-static context, wherein the application of the subset of compression context facilitates establishment of full compression context between the mobile device and the target base station after the inter-base -station handover, wherein the full compression context comprising compression static context, compression semi-static context, and compression dynamic context, the full compression context further comprising at least one of Internet Protocol (IP) header, Uniform Datagram Protocol (UDP) header, or Real-Time Transfer Protocol (RTP) header.

48. The wireless communications apparatus of claim 46, wherein the memory further retains instructions related to:
  compression of at least one data packet based at least in part on the subset of compression context established between the mobile device and the target base station to facilitate establishing a remaining subset of compression context to be established between the mobile device and the target base station; and
  transmission of the at least one data packet, comprising compressed data, to the mobile device to facilitate establishing the remaining subset of compression context to establish full compression context between the mobile device and the target base station.

49. A wireless communications apparatus that facilitates communication associated with a mobile device, comprising:
  means for receiving a subset of compression context from a source base station to facilitate establishing at least the subset of compression context prior to or during inter-base -station handover of the mobile device from the source base station to a target base station; and
  means for applying the subset of compression context to establish at least the subset of compression context prior to or during the inter-base-station handover.

50. The wireless communications apparatus of claim 49, the subset of compression context comprising at least one of compression static context or compression semi-static context, wherein the applying the subset of compression context facilitates establishing full compression context between the mobile device and the target base station after the inter-base-station handover.

51. The wireless communications apparatus of claim 49, further comprising:
  means for compressing at least one data packet based at least in part on the subset of compression context established between the mobile device and the target base station to facilitate establishing a remaining subset of compression context to be established between the mobile device and the target base station; and
  means for transmitting the at least one data packet, comprising compressed data, to the mobile device to facilitate establishing the remaining subset of compression context to establish full compression context between the mobile device and the target base station.

52. A computer program product, comprising:
  a non-transitory computer-readable medium comprising code for:
  receiving a subset of compression context from a source base station to facilitate establishing at least the subset of compression context prior to or during inter-base-station handover of the mobile device from the source base station to a target base station; and
  applying the subset of compression context to establish at least the subset of compression context prior to or during the inter-base-station handover.

53. The computer program product of claim 52, the subset of compression context comprising at least one of compression static context or compression semi-static context, wherein the applying the subset of compression context facilitates establishing full compression context between the mobile device and the target base station after the inter-base-station handover.

54. The computer program product of claim 52, further comprising:

a non-transitory computer-readable medium comprising code for:

compressing at least one data packet based at least in part on the subset of compression context established between the mobile device and the target base station to facilitate establishing a remaining subset of compression context to be established between the mobile device and the target base station; and transmitting the at least one data packet, comprising compressed data, to the mobile device to facilitate establishing the remaining subset of compression context to establish full compression context between the mobile device and the target base station.

55. In a wireless communications system, an apparatus comprising:

a processor configured to:

receive of a subset of compression context from a source base station to facilitate establishing at least the subset of compression context prior to or during inter-base-station handover of the mobile device from the source base station to a target base station; and apply the subset of compression context to establish at least the subset of compression context prior to or during the inter-base-station handover.

* * * * *